(12) United States Patent
Takaku

(10) Patent No.: US 8,361,567 B2
(45) Date of Patent: Jan. 29, 2013

(54) LIQUID CRYSTAL COMPOSITION, LIQUID CRYSTAL DEVICE, REFLECTIVE DISPLAY MATERIAL, AND LIGHT MODULATING MATERIAL

(75) Inventor: Koji Takaku, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 521 days.

(21) Appl. No.: 12/606,663

(22) Filed: Oct. 27, 2009

(65) Prior Publication Data

US 2010/0103337 A1 Apr. 29, 2010

(30) Foreign Application Priority Data

Oct. 28, 2008 (JP) ................................. 2008-277254

(51) Int. Cl.
*C09K 19/02* (2006.01)
*C09K 19/54* (2006.01)
*G02F 1/133* (2006.01)
*G02B 5/00* (2006.01)

(52) U.S. Cl. .................... 428/1.1; 349/115; 252/299.01; 252/299.5; 252/589

(58) Field of Classification Search ............. 252/299.01, 252/299.5, 299.7, 589; 349/115; 428/1.1
See application file for complete search history.

(56) References Cited

U.S. PATENT DOCUMENTS

2004/0131799 A1 7/2004 Arsenault et al.
2008/0303985 A1* 12/2008 Hayashi et al. ................. 349/88

FOREIGN PATENT DOCUMENTS

WO WO 2007145247 A1 * 12/2007

OTHER PUBLICATIONS

Weissman et al., "Thermally Switchable Periodicities and Diffraction from Mesoscopically Ordered Materials", Science, vol. 274, pp. 959-960, Nov. 8, 1996.
Holtz et al., "Polymerized colloidal crystal hydrogel films as intelligent chemical sensing materials", Nature, vol. 389, pp. 829-832, Oct. 23, 1997.
Graugnard et al., "Electric-field tuning of the Bragg peak in large pore $TiO_2$ inverse shell opals", Physical Review, B 72, pp. 233105-1-233105-4, 2005.
Jiqiang et al., "Electric-Field-Induced Rejection-Wavelength Tuning of Photonic-Bandgap Composites", Advanced Materials, vol. 17, 2463-2467, 2005.
Ueno et al., "An Electro- and Thermochromic Hydrogel as a Full-Color Indicator", Advanced Materials, vol. 19, pp. 2807-2812, 2007.
Tsurutani et al., "A Light Induced Change in Cholesteric Pitch by Photoracemization of a Chiral Pyrenyl Sulfoxide", Chemistry Letters, pp. 87-88, 1999.
Mena et al., "Camphor and nopinone derivatives as new photosensitive chiral dopants", Liquid Crystals, vol. 27, pp. 929-933, 2000.
Xianyu et al., "In-plane switching of cholesteric liquid crystals for visible and near-infrared applications", Applied Optics, vol. 43, No. 26, pp. 5006-5015, Sep. 10, 2004.
Kim et al., "Reflective Cholesteric Liquid Crystal Gels", Proc. of SPIE, vol. 5936, pp. 59360X-1-59360X-6, 2005.

*Primary Examiner* — Shean C Wu
(74) *Attorney, Agent, or Firm* — Birch, Stewart, Koalsch & Birch, LLP

(57) ABSTRACT

The liquid crystal composition of the invention exhibits selective reflection and changes its selective reflection wavelength by a redox reaction induced by an electric field. The liquid crystal device of the invention has a pair of electrodes, at least one of which is a transparent electrode, and a liquid crystal layer containing the liquid crystal composition between the electrodes. The reflective display material and the light modulating material of the invention include the liquid crystal device described above.

18 Claims, 1 Drawing Sheet

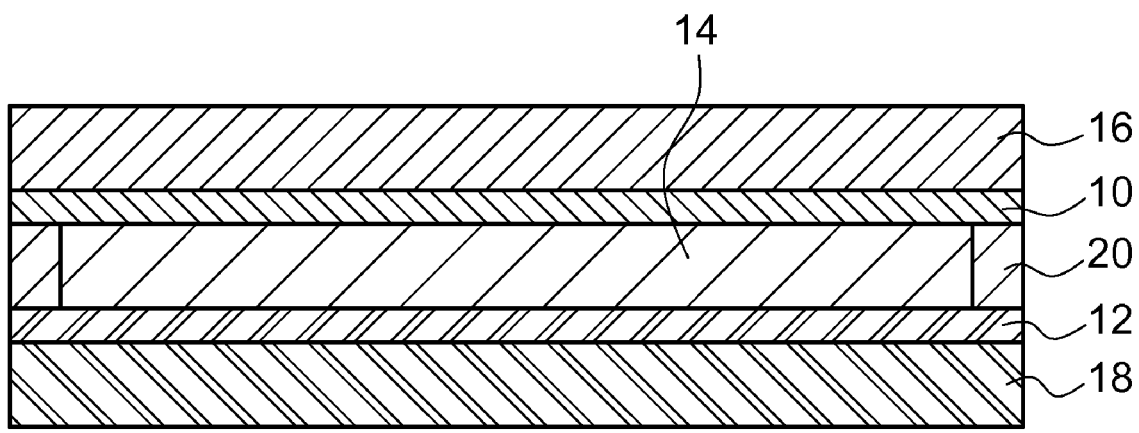

LIQUID CRYSTAL COMPOSITION, LIQUID CRYSTAL DEVICE, REFLECTIVE DISPLAY MATERIAL, AND LIGHT MODULATING MATERIAL

CROSS-REFERENCE TO RELATED APPLICATION

This application claims priority under 35 USC 119 from Japanese Patent Application No. 2008-277254 filed on Oct. 28, 2008, the disclosure of which is incorporated by reference herein.

BACKGROUND

1. Field of the Invention

The present invention relates to a liquid crystal composition, a liquid crystal device, a reflective display material and a photochromic material and in particular to a liquid crystal composition changing its selective reflection wavelength by a redox reaction, a liquid crystal device using the liquid crystal composition, a reflective display material and a light modulating material.

2. Related Art

Structural color is observed commonly in nature, such as in gloss of fish iris, peacock feather, insect shell, morpho, pearl and opal. A dye color is observed when electrons of a compound interact with visible light thereby absorbing a color of specific wavelength and reflecting other colors to be observed, while a structural color is generated when a nano-periodic structure having a wavelength similar to or shorter than the wavelength of visible light interacts with light through interference, diffraction, refraction, scattering or the like. Accordingly, the structural color is superior to the dye in durability and safety, and in recent years, interference or the like with a pearl pigment or a multilayer film by the structural coloring principle has been used in automobiles and cosmetics.

Blue damselfish takes on bright cobalt blue by a multilayer structure of cytoplasm and a reflecting platelet and is known to instantly change the color by changing its laminate intervals upon external stimulation (that is, motility structural color). In recent years, technology for such change in biological structural color has been extensively studied (see, for example, Science, 274, 959 (1996) and Nature, 389, 829 (1997)).

Generally, structural color wavelength (selective reflection wavelength) $\lambda$ is represented by the following Bragg reflection formula:

Bragg reflection formula: $n \cdot \lambda = 2d \cdot \sin \theta$ wherein n represents the refractive index of a medium, d represents the interval of a periodic structure of the refractive index, and $\theta$ is an incident angle of light.

By regulating n and d in the formula, the selective reflection wavelength $\lambda$ can be regulated, and attempts at change thereof have been made by various external stimuli (light, heat, pressure, chemical stimuli, etc.).

Generally, when the structural color is applied to optical devices such as display devices including displays, electric stimuli are suitable as external stimuli, from the viewpoint of device structure and device stability.

Proposals have been made of toning of structural color by electric stimuli includes toning utilizing a change in refractive index by orientation modulation of a liquid crystal filled in inverse opal (see, for example, Physical Review, B72, 233105 (2005)), toning utilizing a change in periodic structure using a dielectric elastomer (see, for example, Advanced Materials, 17, 2463 (2005)), toning utilizing a size change of gel responding to pH change by hydrolysis of water (see, for example, Advanced Materials, 19, 2807 (2007)), and toning utilizing an opal-included polymer expanding or shrinking in response to a change in hydrophilicity and hydrophobicity by the redox reaction of ferrocenyl silane (see, for example, U.S. Serial No. 2004/0131799A1).

It is known that a cholesteric liquid crystal, similar to an opal structure and a thin-film interference structure, shows structural coloration. Its selective reflection wavelength is represented by the product of pitch length and average refractive index, as shown in the following formula 1:

$$m \times \lambda = P \times n \times \cos \theta \qquad 1$$

wherein m represents a positive integer, n is the average refractive index of a liquid crystal (average refractive index: the mean of refractive indexes in long and short axes), P represents the pitch length of a helical periodic structure (pitch length: periodic distance for a liquid crystal molecule to rotate by 360° when its helical axis is observed in the axial direction), and $\theta$ represents the angle between a normal line of a sample surface and a helical axis.

In toning of structural color by a cholesteric liquid crystal, unlike an opal structure or a thin-film interference structure, a change in pitch length in the direction of liquid-crystal molecular orientation is utilized, so there is an advantage that the toning is not accompanied by volume change. Attempts at changing pitch length by external stimuli have been extensively made, and a method of changing it by heat or light has been proposed (see, for example, Chemistry Letters, 1999, 87-88 (1999) and Liquid Crystals, 27, 929-933 (2000)), while there are few proposals for the method by electric stimuli.

As the proposal by electric stimuli, a method of changing pitch length by applying an electric field or a magnetic field to a liquid crystal in a direction perpendicular to a helical axis is known (see, for example, APPLIED OPTICS, 43, 5006 (2004)).

However, this method cannot be said to be an effective method because manufacture of a device is not easy because of necessity for complicated steps in manufacture of electrodes, such as photolithography, and an extremely high voltage is required for toning because of difficult reduction in the distance between electrodes.

A method of changing apparent selective reflection wavelength by inclining the helical axis $\theta$ of a cholesteric liquid crystal, as shown in formula 1 above, has been reported (see, for example, Proc. of SPIE, Vol. 5936, 59360X-1 to 59360X-6 (2005)).

However, this method cannot be said to be a method excellent in principle because there are many problems: for example, the visual field generating selective reflection is extremely limited; the light extraction efficiency (reflectance) by interfacial reflection is significantly reduced for the reason of its principle; and application of high voltage is necessary.

SUMMARY

The present invention has been made in view of the above circumstances and provides a liquid crystal composition exhibiting selective reflection and changing its selective reflection wavelength by a redox reaction induced by an electric field.

BRIEF DESCRIPTION OF THE DRAWING

Exemplary embodiments of the present invention will be described in detail based on the following figures, wherein:

FIG. 1 is a schematic sectional view showing one example of the liquid crystal device of the invention.

DETAILED DESCRIPTION OF THE INVENTION

In the method proposed above, a structural color is exhibited, without using a dye, by selective reflection derived from the dielectric characteristic and nanoperiodic structure of a material used. By the method, therefore, a single device can exhibit various structural colors by changing its refractive index and the interval of its periodic structures, so the method can be considered to be a method most effective in multicolor display.

That is, in the conventional multicolor display, devices of the respective colors should be set in array, but in the method proposed above, the respective colors can be displayed by a single device.

In the above-mentioned method, however, volume change such as expansion and shrinkage is utilized, and thus there is a problem that the size of a display site itself is changed. In addition, application of significantly high voltage is necessary for toning, and the response time is prolonged. There is also a problem that the variation width of selective reflection wavelength is small, that is, the constitution of a device is complicated.

The inventors made extensive study, and as a result, found an epoch-making phenomenon in which when an electric field is applied to a liquid crystal exhibiting selective reflection thereby cause a redox reaction particularly the redox reaction of a dopant contained in the liquid crystal, selective reflection wavelength is changed with a low voltage and at a high response speed.

Generally, it is common practice to use hydrophobic liquid crystals in display devices, and under the present circumstances, there is no attempt at using a redox reaction. The phenomenon in which the selective reflection wavelength of a liquid crystal is changed by the redox reaction of a liquid crystal composition is not known, and it is a new fact that the above effect can be obtained.

Hereafter, the invention will be explained in detail. In the specification, ranges indicated with "to" mean ranges including the numerical values before and after "to" as the minimum and maximum values.

<Liquid Crystal Composition>

The liquid crystal composition of the invention shows selective reflection and changes its selective reflection wavelength by a redox reaction induced by an electric field.

By the liquid crystal composition of the invention, the selective reflection wavelength can be changed with a low voltage and at a high response without volume shrinkage, so that even by a single device, there can be provided a liquid crystal device, a reflective display material and a light modulating material that are capable of multicolor display. The noted problems of the previous liquid crystal devices for multicolor display can be solved by the liquid crystal composition of the invention.

First, the mechanism for the change of selective reflection wavelength in the liquid crystal composition of the invention will be described.

In the invention, the "selective reflection" refers to reflection of light with specific wavelength, which occurs where a nanoperiodic structure having a wavelength similar to or shorter than the wavelength of visible light interacts with light through interference, diffraction, refraction, scattering or the like, and the selective reflection is synonymous with structural coloration. The selective reflection wavelength refers to maximum reflection wavelength in structural coloration.

That is, selective reflection occurs due to a phenomenon such as light interference upon incidence of light on a periodic structure. Accordingly, the liquid crystal composition exhibiting reflective reflection is a liquid crystal composition forming a periodic structure. Specific liquid crystal phases that can be used in the invention will be described later.

The selective reflection wavelength changes upon change in the periodicity of the periodic structure of the liquid crystal composition. For example, dopants added to the liquid crystal composition undergo a redox reaction, thereby changing repellent force or attractive force between the dopants or between the dopant and the liquid crystal, thus changing the periodicity of the periodic structure.

As one example, the change in selective reflection wavelength in the cholesteric liquid crystal is now described.

The selective reflection wavelength $\lambda$ in the cholesteric liquid crystal is represented by the following formula 1:

$$m \times \lambda = P \times n \times \cos\theta \qquad 1$$

wherein m represents a positive integer, n is the average refractive index of a liquid crystal (average refractive index: the mean of refractive indexes in long and short axes), P represents the pitch length of a helical periodic structure (pitch length: periodic distance for a liquid crystal molecule to rotate by 360° when its helical axis is observed in the axial direction), and $\theta$ represents the angle between a normal line of a sample surface and a helical axis.

As can be seen from formula 1, the change of the selective reflection wavelength $\lambda$ in the cholesteric liquid crystal occurs by change in helical axis inclination $\theta$ and pitch length P.

However, when the helical axis is inclined, the visual field generating selective reflection relative to the angle of incidence of light is extremely limited, and the light extraction efficiency (reflectance) by interfacial reflection is significantly reduced for the reason of its principle, as described above, and thus this method cannot be said to excellent in principle.

The pitch length P is represented by the following formula 2:

$$P = 1/(HTP \times c) \qquad 2$$

In the formula 2, c represents the content of a chiral dopant, and HTP (1/µm) indicates the HTP value of the chiral dopant. As used herein, the HTP value refers to the power of the chiral dopant for twisting the liquid crystal (the helical twisting power) and is represented by the number of revolutions per µm (pitch number).

Accordingly, the change of pitch length in the cholesteric liquid crystal occurs by change in the HTP value and/or the concentration c of the chiral dopant.

Hereinafter, the cause for change in pitch length when the liquid crystal composition of the invention is a cholesteric liquid crystal will be described. The reason for change in pitch length is not revealed and is estimated as follows. However, the invention is not limited by the following estimation.

i) When the pitch length is changed by change in the HTP value of the dopant

When the dopant undergoes an oxidization or reduction reaction, its interaction with the liquid crystal changes, and the HTP value changes. As a result, the pitch length is estimated to change. The dopant is preferably a chiral compound.

ii) When the pitch length is changed by change in the concentration c of the dopant When the dopant undergoes an oxidization or reduction reaction, the dopant changes its solubility in the liquid crystal and thereby precipitates. The dopant concentration thereby changes. As a result, the pitch length is estimated to change. The dopant is preferably a chiral compound.

The change in the selective reflection wavelength by the redox reaction has been described with reference to the cholesteric liquid crystal containing a chiral dopant. The type of the liquid crystal phase and the type of the dopant are not limited as long as the liquid crystal composition is one changing the periodicity of its periodic structure by a redox reaction.

For example, in the case of smectic C* phase, the redox reaction causes a change in the HTP value of the chiral dopant or a change in the concentration of the dopant, thereby changing periodicity such as in the cholesteric liquid crystal.

When the dopant is an achiral compound, the redox reaction causes a change in the hydrophilicity and hydrophobicity of the host liquid crystal, thereby inducing a change in interaction between the chiral dopant not causing oxidoreduction and the host liquid crystal. As a result, the HTP value of the chiral dopant changes or the dopant precipitates, thereby increasing the concentration of the chiral dopant causing no oxidoreduction to change periodicity.

The liquid crystal composition in the invention may be a thermotropic or lyotropic liquid crystal composition as long as it shows selective reflection, but is preferably a thermotropic liquid crystal composition.

The liquid crystal phase may be any liquid crystal phase as long as it exhibits selective reflection, but is preferably a smectic phase, a nematic phase (chiral nematic phase (cholesteric phase)), a TGBA phase, a blue phase, a discotic phase or a cubic phase. The liquid crystal phase is more preferably a smectic C* phase or a chiral nematic phase (cholesteric phase), still more preferably a chiral nematic phase (cholesteric phase) from the viewpoint of response speed considered together with the speed of the oxidoreduction process.

The liquid crystal composition of the invention preferably contains at least one dopant and a host liquid crystal and may also contain other additives. The liquid crystal composition is more preferably a composition containing at least one dopant, a host liquid crystal, and a supporting electrolyte.

(Host Liquid Crystal)

The host liquid crystal in the invention is not particularly limited as long as it shows selective reflection. For example, a liquid crystal compound exhibiting a nematic phase or a smectic phase can be used.

Specific examples of such liquid crystal compound include an azomethine compound, a cyanobiphenyl compound, a cyanophenyl ester, a fluorine-substituted phenyl ester, a cyclohexanecarboxylate phenyl ester, a fluorine-substituted cyclohexanecarboxylate phenyl ester, cyanophenylcyclohexane, a fluorine-substituted phenylcyclohexane, a cyano-substituted phenylpyrimidine, a fluorine-substituted phenylpyrimidine, an alkoxy-substituted phenylpyrimidine, a fluorine-substituted, alkoxy-substituted phenylpyrimidine, phenyldioxane, a tolan compound, a fluorine-substituted tolan compound, and alkenylcyclohexyl benzonitrile.

These liquid crystal compounds are described in detail in Liquid Crystal Device Handbook, pp. 154-192 and pp. 715-722, edited by No. 142 Committee of Japan Society for the Promotion of Science, published by Nikkan Kogyo Shimbum (1989). A fluorine-substituted host liquid crystal suitable for TFT driving may also be used.

These liquid crystal compounds may be used alone or in combination of two or more thereof.

The host liquid crystal in the invention is preferably one having high electrochemical stability, more preferably one having a cyclohexane ring or a dioxane ring.

As the host liquid crystal having high electrochemical stability, ZLI-2806 manufactured by Merck or the like may be used.

As the host liquid crystal, a two-frequency driving liquid crystal can also be used.

The two-frequency driving liquid crystal is a liquid crystal which exhibits positive dielectric constant anisotropy when the frequency of the electric field is applied to the liquid crystal under a low frequency region and exhibits revered negative dielectric constant anisotropy when the frequency of the electric field is applied to the liquid crystal under a high frequency region. Such liquid crystals are described in detail in Liquid Crystal Device Handbook, pp. 189-192, edited by No. 142 Committee of Japan Society for the Promotion of Science, published by Nikkan Kogyo Shimbum (1989).

As specific examples, two-frequency driving liquid crystals manufactured by Sigma-Aldrich Corporation are shown below.

Two-Frequency Driving Liquid Crystal 1

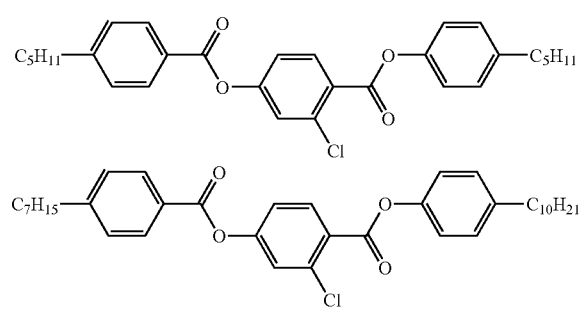

Commercial two-frequency driving liquid crystal materials include DF-02XX, DF-05XX, FX-1001, and FX-1002 manufactured by Chisso Corp. and MLC-2048 manufactured by Merck.

Specific examples of the skeleton of the two-frequency driving liquid crystal include an azomethine compound, a cyanobiphenyl compound, a cyanophenyl ester, a fluorine-substituted phenyl ester, a cyclohexanecarboxylate phenyl ester, a fluorine-substituted cyclohexanecarboxylate phenyl ester, cyanophenylcyclohexane, a fluorine-substituted phenylcyclohexane, a cyano-substituted phenylpyrimidine, a fluorine-substituted phenylpyrimidine, an alkoxy-substituted phenylpyrimidine, a fluorine-substituted, alkoxy-substituted phenylpyrimidine, phenyldioxane, a tolan compound, a fluorine-substituted tolan compound, and alkenylcyclohexyl benzonitrile.

The two-frequency driving liquid crystal compounds used in the invention may be mixtures of a plural liquid crystalline compounds. The liquid crystal composition of the invention may comprise liquid crystal compounds so as not to show an inversion of the sign of the dielectric anisotropy between a low frequency region and a high frequency region of the applied electric field.

When a supporting electrolyte is contained for a redox reaction in the liquid crystal composition, the host liquid crystal is desirably one having high hydrophilicity for dissolving the supporting electrolyte, and specifically the host liquid crystal has a clog P value of 10 or less, more preferably 9 or less.

The clog P value is a value calculated using a program based on "Hansch-Leo fragment method" (log P value is estimated by dividing a chemical structure into partial structures (fragments) and then summing up extents of contribution to log P assigned to the fragments).

The clog P value is described in detail in C. Hansch, A. Leo, Substituent Constants for Correlation Analysis in Chemistry and Biology, John Wiley & Sons, and A. J. Leo. Calculating log Poct from structure. Chem. Rev. 93, 1281-1306, 1993.

In the highly hydrophilic host liquid crystal, its liquid crystal core moiety consisting of two or more cyclic structures is preferably a core moiety of benzene, pyridine, pyrimidine or dioxane rings, and its substituent preferably has a polar group such as a cyano group or halogen. The two or more cyclic structures may be linked via a linking group, and the linking group is preferably an ester, ether, amide or the like.

Generally, a terminal alkyl chain used in stabilizing the liquid crystal phase is preferably as short as possible. The terminal alkyl chain has preferably 12 carbon atoms or less, more preferably 8 carbon atoms or less, still more preferably 6 carbon atoms or less.

For enhancing display contrast, a host liquid crystal having a refractivity anisotropy ($\Delta n$) of 0.01 or more is preferable. The refractivity anisotropy ($\Delta n$) is more preferably 0.01 to 0.4, still more preferably 0.03 to 0.3.

To perform a redox reaction in the liquid crystal, the dielectric constant is preferably higher, more preferably 2 or more, particularly preferably 3 or more.

The dielectric constant anisotropy ($\Delta\in$) may be positive or negative, but when a redox reaction induced by an electric field is carried out, the dielectric constant anisotropy ($\Delta\in$) is more preferably negative for decreasing the influence of the orientation of the electric field.

(Dopant)

The dopant in the invention refers to an additive added to the liquid crystal composition and is a compound causing a redox reaction. The dopant may be a liquid crystal compound or a non-liquid-crystal compound.

Examples of the dopant include a ferrocene compound, an anthraquinone compound, a viologen compound and derivatives thereof, and an organometal complex.

The redox potential of the dopant is preferably $-2.5$ V to $+2.5$ V, more preferably $-2.2$V to $-0.2$V or $+0.1$V to $+1.8$V, and particularly preferably $-1.8$ V to $-0.4$V or $+0.3$V to $1.0$V, relative to a reference electrode SCE (saturated calomel electrode).

The dopant used in the invention may be a dopant which undergoes one-electron reduction or one-electron oxidation or a dopant which undergoes two-electrons reduction or two-electrons oxidation as long as at least one electron of the dopant has a redox potential within the above redox potential range. Alternatively, the dopant may be a dopant that undergoes a redox reaction involving more than two electrons, as long as at least one electron of the dopant has a redox potential within the above redox potential range. In short, a dopant is within the scope of the dopant of the invention as long as at least one electron has a redox potential within the above range, regardless of the redox potential of the other electron(s).

The content of the dopant is preferably 40% by weight or less, more preferably 30% by weight or less, even more preferably 20% by weight or less, based on the total amount of the liquid crystal composition.

In the present invention, the dopant may be either an achiral compound or a chiral compound, more preferably a chiral compound (that is, a chiral dopant), from the viewpoint of enlarging the change of selective reflection wavelength.

The difference in solubility of the achiral dopant in the liquid crystal before and after the redox reaction is preferably larger, more preferably 10 or more, still more preferably 100 or more, further more preferably 1000 or more.

On the other hand, the difference in solubility of the chiral dopant in the liquid crystal before and after the redox reaction is not particularly limited.

The achiral dopant includes, for example, ferrocene derivatives (ferrocene, ferrocene having a liquid crystalline group, etc.), viologen derivatives, polythiophene derivatives and quinone derivatives, among which ferrocene having a liquid crystalline group and viologen derivatives are preferable.

These may be used alone or in combination of two or more thereof.

In the present invention, the chiral dopant may be liquid crystalline or non-liquid-crystalline as long as it is a compound causing a redox reaction, but is preferably liquid crystalline from the viewpoint of compatibility with the host liquid crystal. The chiral dopant may be used in combination with a chiral dopant not causing oxidoreduction such that the selective reflection wavelength comes to be in the range of 200 nm to 1000 nm.

The HTP value of the chiral dopant in the invention is preferably 1 to 100, more preferably 3 to 100, more preferably 5 to 100.

The total content of all chiral dopants including the chiral dopant causing oxidoreduction is not particularly limited as long as the selective reflection wavelength is in the range of 200 nm to 1000 nm, but is preferably 3 to 30% by weight, more preferably 5 to 20% by weight, based on the total amount of the liquid crystal composition.

These may be used alone or in combination of two or more thereof. A chiral dopant not causing oxidoreduction may also be contained.

The content of the chiral dopant causing oxidoreduction in the invention is 1 to 100% by weight, more preferably 3 to 100% by weight, based on the total amount of the chiral dopants.

The chiral dopant in the invention is preferably a compound represented by the following formula (1):

In the formula (1), A represents a site having an asymmetric carbon, L represents a divalent linking group, Rd represents a site causing a redox reaction, B represents a liquid crystalline substituent, D represents an arylene group, a heteroarylene group or a divalent alicyclic hydrocarbon group, x represents 0 or 1, z represents an integer of 0 to 3, y represents an integer of 1 to 4, w represents 0 or 1, and s represents 0 or 1 provided that the total number of Rds is 1 to 4.

When z is 2 or more, a plural Bs may be the same or different. When y is 2 or more, a plural $((L)x-(D)w-(Rd)_s-(B)z)$ units may be the same or different.

A in the formula (1) is a site having an asymmetric carbon, preferably a site having an asymmetric carbon of a generally used chiral dopant, and examples include compounds derived from optically active alcohols, ethane-1,2-diol, sugars (dianhydrohexitol etc.), binaphthol, and cholesterols.

Specific examples of A in the formula (1) are shown below.

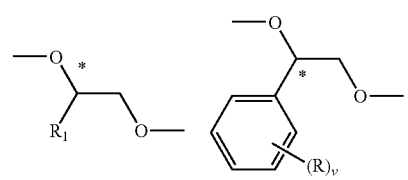

-continued

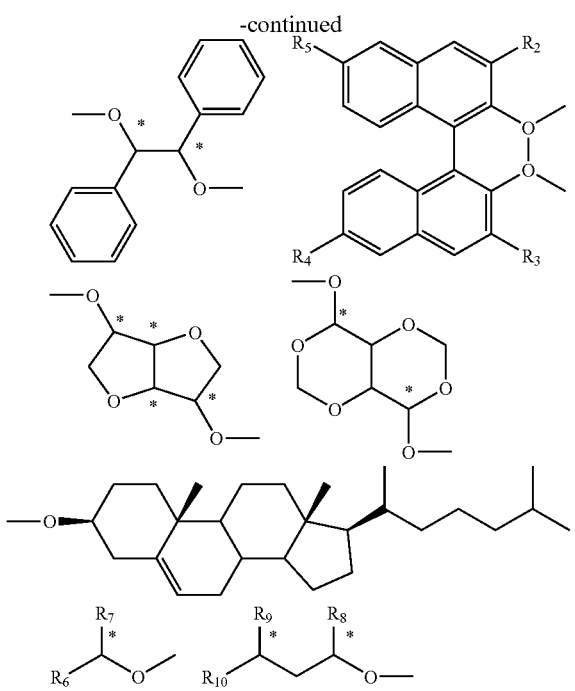

wherein $R_1$ to $R_{10}$ each represent a substituent and is preferably a substituent mentioned in a substituent group V shown later. Particularly, A in the formula (1) is preferably the following structure.

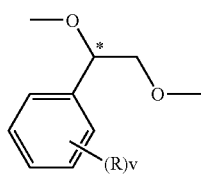

Accordingly, the formula (1) is preferably a compound represented by the following formula (1-1).

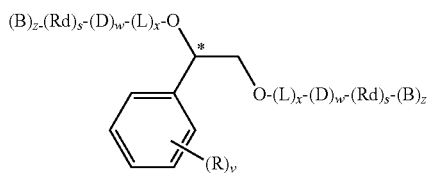

Formula (1-1)

In the formula (1-1), L, D, Rd, B, s, x, z and w have the same meanings as defined in L, D, Rd, B, s, x, z and w in the formula (1).

In the formula (1-1), R is a substituent and includes groups in the substituent group V shown later, among which R in the formula (1-1) is preferably a substituted or unsubstituted alkyl group (also including an alicyclic hydrocarbon group), an aryl group, a cyano group, an ester (an acyloxy group, an alkoxycarbonyl group, an aryloxycarbonyl group), an ether (an alkoxy group, an aryloxy group), an amide (a carbamoyl group, an acylamino group), a nitro group, an alkylamino group, an arylamino group, a hydroxy group or a halogen atom, more preferably a substituted or unsubstituted alkyl group (also including an alicyclic hydrocarbon group), an aryl group, a cyano group, an ester (an acyloxy group, an alkoxycarbonyl group, an aryloxycarbonyl group), an ether (an alkoxy group, an aryloxy group), or a halogen atom.

The alkyl group represented by R in the formula (1-1) is preferably one having 1 to 20 carbon atoms, more preferably 1 to 16 carbon atoms, even more preferably 1 to 14 carbon atoms.

The aryl group represented by R in the formula (1-1) is preferably one having 6 to 24 carbon atoms, more preferably 6 to 20 carbon atoms, even more preferably 6 to 18 carbon atoms.

In the formula (1-1), v is an integer of 0 to 5, preferably 0 to 3, more preferably 0 to 2.

In the formula (1), L represents a divalent linking group. L is preferably an ether group, an ester group (—COO—, —OCO—) or a carbonyl group, more preferably a carbonyl group.

Rd in the formula (1) represents a site causing a redox reaction. Rd is preferably a site causing oxidation or reduction of 2 electrons or more. Specific examples include ferrocene, anthraquinone, viologen and their derivatives, and organometal complexes (for example, copper I-valent complex, copper II-valent complex, ruthenium complex, etc.), among which ferrocene, anthraquinone or their derivatives are preferable. In the specification, the "derivative" refers to a compound subjected to substitution, addition etc. for the purpose of regulating the redox potential of ferrocene or anthraquinone or the solubility thereof in the liquid crystal.

Particularly, Rd is preferably anthraquinone or an anthraquinone derivative, from the viewpoint of causing oxidation and reduction of 2 electrons or more and increasing a change in interaction with the host liquid crystal.

When Rd is anthraquinone or an anthraquinone derivative, the binding position of A-(L)x-(D)w-*1 in the formula (1) wherein *1 represents a position binding to Rd is preferably the position 5, 6, 7, or 8 in anthraquinone or an anthraquinone derivative, more preferably the position 6 or 7, still more preferably the position 7.

When Rd is anthraquinone or an anthraquinone derivative, the binding position of —(B)$_z$ in the formula (1) is preferably the position 1, 2, 3, or 4 in anthraquinone or an anthraquinone derivative, and when the binding position of A-(L)x-(D)w-*1 is the position 6, the binding position of —(B)$_z$ is preferably the position 2 or 3. However, when —(B)$_z$ is an arylthio group, the binding position of —(B)$_z$ is preferably the position 1 or 4.

Accordingly, when Rd is anthraquinone or an anthraquinone derivative, the formula (1-2) or (1-3) can be mentioned as one of preferable chiral dopants.

Formula (1-2)

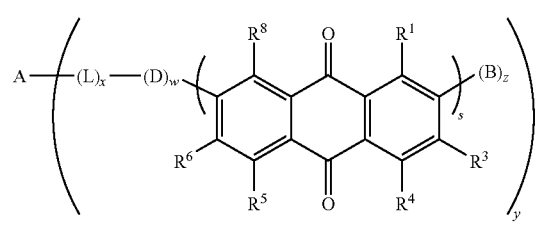

Formula (1-3)

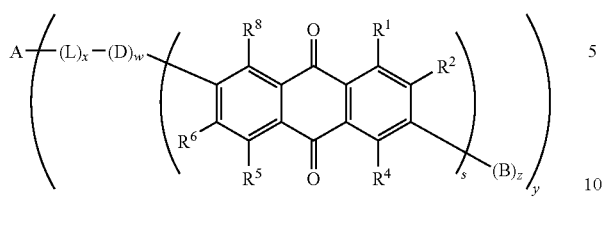

In the formulae (1-2) and (1-3), A, L, D, B, s, x, y, z and w have the same meanings as defined in A, L, D, B, s, x, y, z and w in the formula (1).

In the formulae (1-2) and (1-3), $R^1$, $R^2$, $R^3$, $R^4$, $R^5$, $R^6$ and $R^8$ each independently represent a hydrogen atom or a substituent, and the substituent includes substituents in the substituent group V shown later.

Preferably, $R^1$, $R^2$, $R^3$, $R^4$, $R^5$, $R^6$ and $R^8$ each independently represent a hydrogen atom, an aryl group, an alkyl group, an alkoxy group, a hydroxy group, an ester (—$CO_2$—, —OCO—), an amide (—NHCO—, —CONH—), an arylthio group or a halogen atom.

From the viewpoint of durability to oxidoreduction, Rd is preferably ferrocene or a ferrocene derivative.

When Rd is ferrocene or a ferrocene derivative, the binding position of A-(L)x-(D)w-*1 in the formula (1), wherein *1 represents a position binding to Rd may be either in ferrocene or in a ferrocene derivative.

When Rd is ferrocene or a ferrocene derivative, the binding position of —(B)$_z$ in the formula (1) may be on the same cyclopentadienyl ring, or on another cyclopentadienyl ring, relative to the binding position of A-(L)x-(D)w-*1. The binding position of —(B)$_z$ when present on the same ring is preferably the position 3 or 4 assuming that the binding position of *1 is the position 1.

Accordingly, when Rd is ferrocene or a ferrocene derivative, the chiral dopant is preferably the formula (1-4) or (1-5):

Formula (1-4)

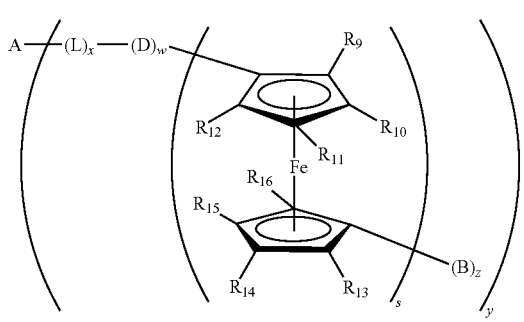

Formula (1-5)

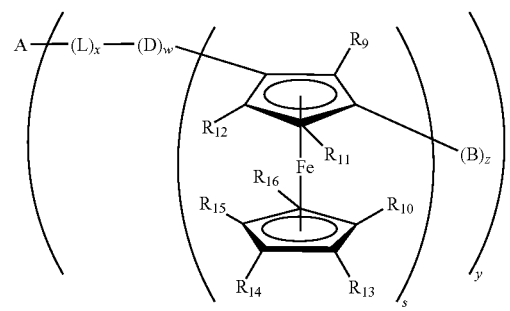

In the formulae (1-4) and (1-5), A, L B, D, s, w, x, y and z have the same meanings as defined in A, L B, D, s, w, x, y and z in the formula (1).

In the formulae (1-4) and (1-5), $R^9$, $R^{10}$, $R^{11}$, $R^{12}$, $R^{13}$, $R^{14}$, $R^{15}$ and $R^{16}$ each independently represent a hydrogen atom or a substituent, and the substituent includes substituents in the substituent group V shown later.

Preferably, $R^9$, $R^{10}$, $R^{11}$, $R^{12}$, $R^{13}$, $R^{14}$, $R^{15}$ and $R^{16}$ each independently represent a hydrogen atom, an alkyl group, an ester (—$CO_2$—) or an amide (—CONH—).

B in the formula (1) represents a liquid crystalline substituent. B is not particularly limited as long as the dopant exhibits interaction with the host liquid crystal and exhibits a cholesteric phase in the form of a chiral dopant. This liquid crystalline substituent means a substituent having 2 or more cyclic structures such as a cyclohexane ring and a benzene ring and has a skeleton similar to that of a compound exhibiting liquid crystallinity.

The compound exhibiting liquid crystallinity includes liquid crystal compounds exhibiting a nematic phase or a smectic phase, and specific examples include an azomethine compound, a cyanobiphenyl compound, a cyanophenyl ester, a fluorine-substituted phenyl ester, a cyclohexanecarboxylate phenyl ester, a fluorine-substituted cyclohexanecarboxylate phenyl ester, cyanophenylcyclohexane, a fluorine-substituted phenylcyclohexane, a cyano-substituted phenylpyrimidine, a fluorine-substituted phenylpyrimidine, an alkoxy-substituted phenylpyrimidine, a fluorine-substituted, alkoxy-substituted phenylpyrimidine, phenyldioxane, a tolan compound, a fluorine-substituted tolan compound, and alkenylcyclohexyl benzonitrile.

The compound exhibiting liquid crystallinity is described in detail in Liquid Crystal Device Handbook, pp. 154-192 and pp. 715-722, edited by No. 142 Committee of Japan Society for the Promotion of Science, published by Nikkan Kogyo Shimbum (1989).

In the formula (1), the liquid crystalline substituent B is preferably a group represented by the following formula (2):

$$T^1\text{-}(D^2)_k\text{-}((L^1)_f\text{-}(D^1)_e)_m\text{-}(L^2)_g\text{-}((CH_2)_i\text{-}L^3)_t\text{-}*1 \quad \text{Formula (2)}$$

In the formula (2), *1 represents a position binding to Rd in the formula (1), $D^1$ and $D^2$ each independently represent an arylene group, a heteroarylene group or a divalent alicyclic hydrocarbon group, $L^1$, $L^2$ and $L^3$ each independently represent a divalent linking group, $T^1$ represents an alkyl group, an alkoxy group, an alkoxycarbonyl group, an acyl group, an acyloxy group, a halogen atom or a cyano group. e represents an integer of 1 to 3, f represents an integer of 0 to 2, m represents an integer of 1 to 3, k represents 1 or 2, g represents 0 or 1, i represents an integer of 1 to 20, t represents 0 to 4, and the total number of groups represented by $D^1$ and $D^2$ is an integer of 2 to 5. When e and k each represent 2 or more, two or more $D^1$s and $D^2$s may be the same or different. When m is 2 or more, two or more $((L^1)_f-(D^1)_e)$ units may be the same or different. When f is 2, two $L^1$s represent different linking groups. When t is 2 or more, two or more $((CH_2)_t-L^3)$ units may be the same or different.

The arylene group represented by each of $D^1$ and $D^2$ in the formula (2) is preferably an arylene group having 6 to 20 carbon atoms, more preferably 6 to 10 carbon atoms. Preferable examples of the arylene group include a phenylene group and a naphthalene group such as a 1,4-phenylene group, a naphthalene-2,6-diyl group, and a tetrahydronaphthalene-2,6-diyl group.

The heteroarylene group represented by $D^1$ and $D^2$ in the formula (2) is preferably a heteroarylene group having 1 to 20 carbon atoms, more preferably 2 to 9 carbon atoms. Preferable examples of the heteroarylene group include groups consisting of a pyridine ring, a quinoline ring, an isoquinoline ring, a pyrimidine ring, a pyrazine ring, a thiophene ring, a furan ring, an oxazole ring, a thiazole ring, an imidazole ring, a pyrazole ring, an oxadiazole ring, a thiadiazole ring and a triazole ring, and a heteroarylene group which is obtained by subtracting one hydrogen atom from each of hydrogen atoms bonded to two carbon atoms of a condensed ring formed by condensing the above rings.

The divalent alicyclic hydrocarbon group represented by each of $D^1$ and $D^2$ in the formula (2) is preferably a divalent alicyclic hydrocarbon group having preferably 3 to 20 carbon atoms, more preferably 4 to 12 carbon atoms. Preferable examples of the divalent alicyclic hydrocarbon group include cyclohexanediyl, decahydronaphthalenediyl and spiro[5.5]undecylene, more preferably a cyclohexane-1,4-diyl group, a decahydro naphthalene-2,6-diyl group and a 3,9-spiro[5.5]undecylene group.

The arylene group, the heteroarylene group and the divalent alicyclic hydrocarbon group represented by $D^1$ and $D^2$ in the formula (2) may have a substituent or may be unsubstituted. When e, m or k in the formula (2) is 2 or more, a plural $D^1$s and $D^2$s may independently have a substituent, may have the same substituent or different substituents or may be unsubstituted.

These substituents include the following substituent group V.

(Substituent Group V)

Halogen atoms (e.g. chlorine, bromine, iodine, and fluorine), a mercapto group, a cyano group, a carboxyl group, a phosphoric acid group, a sulfo group, a hydroxy group, a carbamoyl group having 1 to 10 carbon atoms, preferably 2 to 8 carbon atoms, and even more preferably 2 to 5 carbon atoms (e.g. methylcarbamoyl, ethylcarbamoyl, and morpholinocarbamoyl), a sulfamoyl group having 0 to 10 carbon atoms, preferably 2 to 8 carbon atoms, and even more preferably 2 to 5 carbon atoms (e.g. methylsulfamoyl, ethylsulfamoyl, and piperidinosulfamoyl), a nitro group, an alkoxy group having 1 to 20 carbon atoms, preferably 1 to 10 carbon atoms, and even more preferably 1 to 8 carbon atoms (e.g. methoxy, ethoxy, 2-methoxyethoxy, and 2-phenylethoxy), an aryloxy group having 6 to 20 carbon atoms, preferably 6 to 12 carbon atoms, and even more preferably 6 to 10 carbon atoms (e.g. phenoxy, p-methylphenoxy, p-chlorophenoxy, and naphthoxy), an acyl group having 1 to 20 carbon atoms, preferably 2 to 12 carbon atoms, and even more preferably 2 to 8 carbon atoms (e.g. acetyl, benzoyl, and trichloroacetyl), an acyloxy group having 1 to 20 carbon atoms, preferably 2 to 12 carbon atoms, and even more preferably 2 to 8 carbon atoms (e.g. acetyloxy and benzoyloxy), an acylamino group having 1 to 20 carbon atoms, preferably 2 to 12 carbon atoms, and even more preferably 2 to 8 carbon atoms (e.g. acetylamino), an sulfonyl group having 1 to 20 carbon atoms, preferably 1 to 10 carbon atoms, and even more preferably 1 to 8 carbon atoms (e.g. methanesulfonyl, ethanesulfonyl and benzenesulfonyl), a sulfinyl group having 1 to 20 carbon atoms, preferably 1 to 10 carbon atoms, and even more preferably 1 to 8 carbon atoms (e.g. methanesulfinyl, ethanesulfinyl, and benzenesulfinyl), a substituted or unsubstituted amino group having 1 to 20 carbon atoms, preferably 1 to 12 carbon atoms, and even more preferably Ito 8 carbon atoms (e.g. amino, methylamino, dimethylamino, benzylamino, anilino, diphenylamino, 4-methylphenylamino, 4-ethylphenylamino, 3-n-propylphenylamino, 4-n-propylphenylamino, 3-n-butylphenylamino, 4-n-butylphenylamino, 3-n-pentylphenylamino, 4-n-pentylphenylamino, 3-trifluoromethylphenylamino, 4-trifluoromethylphenylamino, 2-pyridylamino, 3-pyridylamino, 2-thiazolylamino, 2-oxazoylamino, N,N-methylphenylamino, and N,N-ethylphenylamino), an ammonium group having 0 to 15 carbon atoms, preferably 3 to 10 carbon atoms, and even more preferably 3 to 6 carbon atoms (e.g. trimethylammonium and triethylammonium), a hydrazino group having 0 to 15 carbon atoms, preferably 1 to 10 carbon atoms, and even more preferably 1 to 6 carbon atoms (e.g. trimethylhydrazino group), an ureido group having 1 to 15 carbon atoms, preferably 1 to 10 carbon atoms, and even more preferably 1 to 6 carbon atoms (e.g. ureido group and N,N-dimethylureido group), an imido group having 1 to 15 carbon atoms, preferably 1 to 10 carbon atoms, and even more preferably 1 to 6 carbon atoms (e.g. succiminido group), an alkylthio group having 1 to 20 carbon atoms, preferably 1 to 12 carbon atoms, and even more preferably 1 to 8 carbon atoms (e.g. methylthio, ethylthio, and propylthio), an arylthio group having 6 to 80 carbon atoms, preferably 6 to 40 carbon atoms, and even more preferably 6 to 30 carbon atoms (e.g. phenylthio, p-methylphenylthio, p-chlorophenylthio, 2-pyridylthio, 1-naphthylthio, 2-naphthylthio, 4-propylcyclohexyl-4'-biphenylthio, 4-butylcyclohexyl-4'-biphenylthio, 4-pentylcyclohexyl-4'-biphenylthio, 4-propylphenyl-2-ethinyl-4'-biphenylthio), a heteroarylthio group having 1 to 80 carbon atoms, preferably 1 to 40 carbon atoms, and even more preferably 1 to 30 carbon atoms (e.g. 2-pyridylthio, 3-pyridylthio, 4-pyridylthio, 2-quinolylthio, 2-furylthio, and 2-pyrrolylthio), an alkoxycarbonyl group having 2 to 20 carbon atoms, preferably 2 to 12 carbon atoms, and even more preferably 2 to 8 carbon atoms (e.g. methoxycarbonyl, ethoxycarbonyl, and 2-benzyloxycarbonyl), an aryloxycarbonyl group having 6 to 20 carbon atoms, preferably 6 to 12 carbon atoms, and even more preferably 6 to 10 carbon atoms (e.g. phenoxycarbonyl), an unsubstituted alkyl group having 1 to 18 carbon atoms, preferably 1 to 10 carbon atoms (e.g. methyl, ethyl, propyl and butyl (also including an aliphatic hydrocarbon (cyclohexane etc.)), a substituted alkyl group having 1 to 18 carbon atoms, preferably 1 to 10 carbon atoms {e.g. hydroxymethyl, trifluoromethyl, benzyl, carboxyethyl, ethoxycarbonylmethyl, and acetylaminomethyl, and herein an unsaturated hydrocarbon group having 2 to 18 carbon atoms, preferably 3 to 10 carbon atoms, and even more preferably 3 to 5 carbon atoms (e.g. a vinyl group, an ethynyl group, a 1-cyclohexenyl group, a benzylidyne group, and a benzylidene group) are also included in the substituted alkyl group}, a substituted or unsubstituted aryl group having 6 to 20 carbon atoms, preferably 6 to 15 carbon atoms, and even more preferably 6 to 10 carbon atoms (e.g. phenyl, naphthyl, p-carboxyphenyl, p-nitrophenyl, 3,5-dichlorophenyl, p-cyanophenyl, m-fluorophenyl, p-tolyl, 4-propylcyclohexyl-4'-biphenyl, 4-butylcyclohexyl-4'-biphenyl, 4-pentylcyclohexyl-4'-biphenyl, and 4-propylphenyl-2-ethinyl-4'-biphenyl), and a substituted or unsubstituted heteroaryl group having 1 to 20 carbon atoms, preferably 2 to 10 carbon atoms, and even more preferably 4 to 6 carbon atoms (e.g. pyridyl, 5-methylpyridyl, thienyl, furyl, morpholino, and tetrahydrofurfuryl).

These substituents in the substituent group V may have a condensed structure of benzene rings or naphthalene groups and these substituents may be substituted with the substituents in the substituent group V illustrated above.

Substituents on the divalent arylene group, on the divalent heteroarylene group and on the divalent alicyclic hydrocarbon group represented by each of $D^1$ and $D^2$ are preferably an alkyl group, an alkoxy group, a halogen atom and a cyano group among the substituents in the substituent group V.

In the formula (2), $L^1$ represents a divalent linking group. $L^1$ is preferably an alkanediyl group, an alkenylene group, an alkynylene group, an ether group, an ester group (—COO—, —OCO—), a carbonyl group, an azo group (—CH=N—, —N=CH—), an azoxy group or an alkyleneoxy group, more preferably an alkanediyl group (for example, an ethylene group), an alkynylene group (for example, an ethynylene group), an ester group or an alkyleneoxy group (for example, a methyleneoxy group).

In the formula (2), $T^1$ represents an alkyl group, an alkoxy group, an alkoxycarbonyl group, an acyl group, an acyloxy group, a halogen atom or a cyano group.

$T^1$ is preferably an alkyl group having preferably 1 to 30 carbon atoms, more preferably 3 to 20 carbon atoms, and even more preferably 3 to 10 carbon atoms (for example, an n-propyl group, an n-butyl group, an n-pentyl group, an n-hexyl group, hydroxymethyl, trifluoromethyl, benzyl, carboxyethyl, ethoxycarbonylmethyl, acetylaminomethyl, or an unsaturated hydrocarbon group having 2 to 18, preferably 3 to 10 carbon atoms (for example, a vinyl group, an ethynyl group, a 1-cyclohexenyl group, a benzylidyne group, or a benzylidene group); an alkoxy group having preferably 1 to 30 carbon atoms, more preferably 3 to 20 carbon atoms, and even more preferably 3 to 10 carbon atoms (for example, an n-propyloxy group, an n-butoxy group, an n-pentyloxy group, an n-hexyloxy group); and a halogen atom (for example, a fluorine atom, a chlorine atom).

In the formula (2), $T^1$ is preferably bonded to $(D^2)_k$ at the para position with respect to $((L^1)_f\text{-}(D^1)_e)$. When k is 2, $T^1$ is preferably bonded to one $(D^2)$ at the para position with respect to the other $(D^2)$.

The alkyl group, alkoxy group, alkoxycarbonyl group, acyl group and acyloxy group represented by $T^1$ in the formula (2) may have or may not have a substituent, and the substituent includes the substituent group V.

A substituent on the alkyl group, alkoxy group, alkoxycarbonyl group, acyl group or acyloxy group represented by $T^1$ is preferably a halogen atom (particularly a chlorine atom, a fluorine atom), a cyano group, a hydroxy group, an alkoxy group or an acyl group, among the substituents in the substituent group V.

In the formula (2), e is an integer of 1 to 3, preferably 1 or 2. When e is 2 or 3, a plural $D^1$s may be the same or different.

In the formula (2), m is an integer of 1 to 3, preferably 1 or 2. When m is 2 or 3, a plural $D^1$s may be the same or different, and a plural $L^1$s may be the same or different.

In the formula (2), k is 1 or 2. When k is 2, a plural $D^2$s may be the same or different.

In the formula (2), f is an integer of 0 to 2, preferably 0 to 1. When f is 2, a plural $L^1$s each represent linking groups different from each other.

The total number of groups represented by $D^1$ and $D^2$ in the formula (2), that is, e×m+k, is preferably an integer of 2 to 5, more preferably an integer of 2 to 4, even more preferably an integer of 2 to 3. When each of e and k is 2 or more, two or more $D^1$s and $D^2$s may be the same or different, and when m is 2 or more, two or more $(L^1)_f\text{-}(D^1)_e$ may be the same or different.

Particularly preferable combinations of e, f, m and k are as follows:
(I) e=1, f=0, m=1, k=1
(II) e=1, f=1, m=1, k=1
(III) e=1, f=0, m=2, k=1
(IV) e=2, f=1, m=1, k=1
(V) e=1, f=1, m=1, k=2
(VI) e=1, f=1, m=2, k=1
(VII) e=2, f=1, m=1, k=2

In the formula (2), $L^2$ represents a divalent linking group. $L^2$ is preferably an ether group, an ester group (—COO—, —OCO—) or a carbonyl group.

In the formula (2), $L^3$ represents a divalent linking group. $L^3$ is preferably an ether group, an ester group (—COO—, —OCO—) or a carbonyl group.

In the formula (2), g is 0 or 1.

In the formula (2), i is an integer of 1 to 20, preferably 1 to 11.

In the formula (2), t is 0 to 4, preferably 0 to 3. When t is 2 or more, a plural $((CH_2)_i\text{-}L^3)$ units may be the same or different, and i may be the same or different.

D in the formula (1) represents an arylene group, a heteroarylene group or a divalent alicyclic hydrocarbon group and may have a substituent or may be unsubstituted. The substituent includes the substituent group V, among which a substituted or unsubstituted alkyl group, an aryl group, a cyano group, an ester (an acyloxy group, an alkoxycarbonyl group, an aryloxycarbonyl group), an ether (an alkoxy group, an aryloxy group), an amide (a carbamoyl group, an acylamino group), a nitro group, an alkylamino group, an arylamino group, a hydroxy group or a halogen atom is preferable. D is more preferably unsubstituted or has a substituted or unsubstituted alkyl group, a cyano group, an ether (an alkoxy group, an aryloxy group), a nitro group, a hydroxy group, or a halogen atom.

The arylene group represented by D in the formula (1) is preferably an arylene group having 6 to 20 carbon atoms, more preferably 6 to 10 carbon atoms. Preferred examples of the arylene group include a phenylene group and a naphthalene group such as a 1,4-phenylene group, a naphthalene-2,6-diyl group, and a tetrahydronaphthalene-2,6-diyl group.

The heteroarylene group represented by D is preferably a heteroarylene group having 1 to 20 carbon atoms, more preferably 2 to 9 carbon atoms. Preferable examples of the heteroarylene group include groups consisting of a pyridine ring, a quinoline ring, an isoquinoline ring, a pyrimidine ring, a pyrazine ring, a thiophene ring, a furan ring, an oxazole ring, a thiazole ring, an imidazole ring, a pyrazole ring, an oxadiazole ring, a thiadiazole ring and a triazole ring, and a heteroarylene group which is obtained by subtracting one hydrogen atom from each of hydrogen atoms bonded to two carbon atoms of a condensed ring formed by condensing the above rings.

The divalent alicyclic hydrocarbon group represented by D is preferably a divalent alicyclic hydrocarbon group having preferably 3 to 20 carbon atoms, more preferably 4 to 12 carbon atoms. Preferable examples of the divalent alicyclic hydrocarbon group include cyclohexanediyl, decahydronaphthalenediyl and spiro[5.5]undecylene, more preferably a cyclohexane-1,4-diyl group, a decahydronaphthalene-2,6-diyl group and a 3,9-spiro[5.5]undecylene group.

In the formula (1), x is 0 or 1, preferably 1.

In the formula (1), z is an integer of 0 to 3, preferably an integer of 0 to 2, more preferably 0 or 1. When z is 2 or more, a plural B's may be the same or different.

In the formula (1), y is an integer of 1 to 4, preferably 1 to 3, more preferably 1 or 2. When y is 2 or more, a plural $((L)_x\text{-}(D)_w\text{-}(Rd)_s\text{-}(B)_z)$ may be the same or different.

In the formula (1), w is 0 or 1.

In the formula (1), s is 0 or 1 provided that the total number of Rd is 1 to 4, more preferably 1 to 2, still more preferably 1.

From the foregoing, the compound represented by the formula (1) is preferably a compound represented by the following formula (3-1), (3-2), (3-3) or (3-4):

In the formulae (3-1), (3-2), (3-3) and (3-4), D, w and z have the same meanings as defined in D, w and z in the formula (1); $T^1, D^1, D^2, L^1, L^2, L^3$, e, f, g, k, m, i and t have the same meanings as defined in $T^1, D^1, D^2, L^1, L^2, L^3$, e, f, g, k, m, i and t in the formula (2); and $R^1, R^2, R^3, R^4, R^5, R^6, R^8, R^9, R^{10}, R^{11}, R^{12}, R^{13}, R^{14}, R^{15}$ and $R^{16}$ have the same meanings as defined in $R^1, R^2, R^3, R^4, R^5, R^6, R^8, R^9, R^{10}, R^{11}, R^{12}, R^{13}, R^{14}, R^{15}$ and $R^{16}$ in the formulae (1-2), (1-3), (1-4) and (1-5).

Formula (3-1)

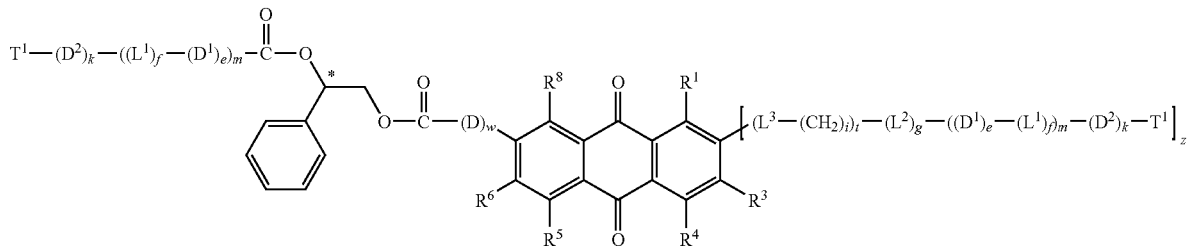

Formula (3-2)

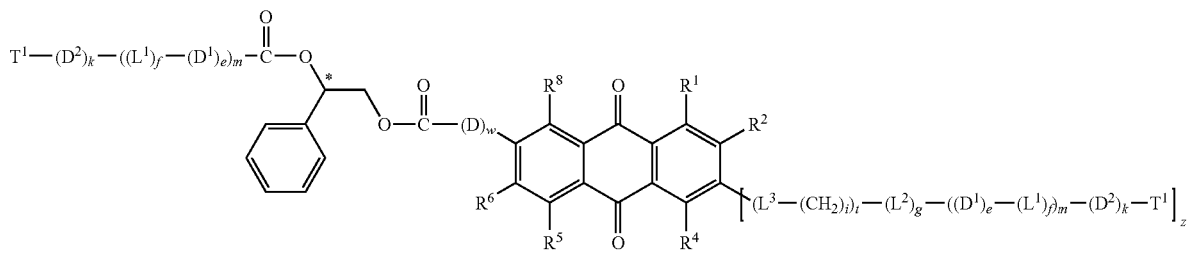

Formula (3-3)

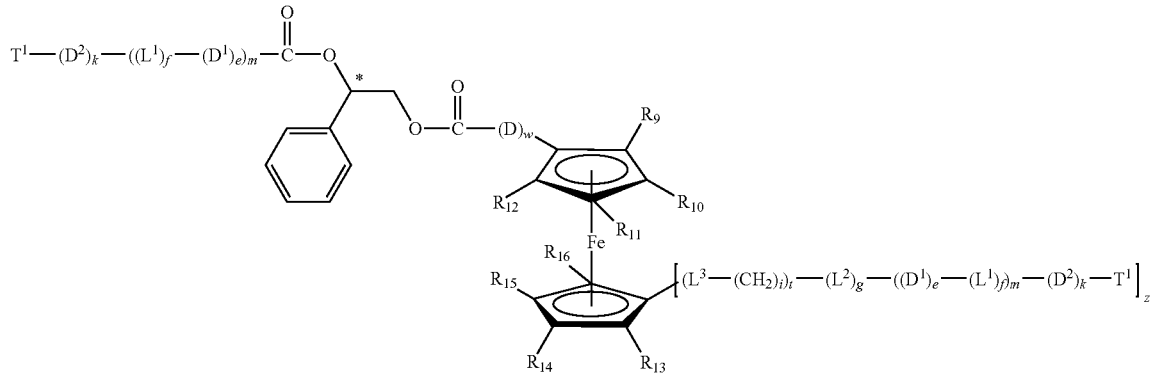

Formula (3-4)

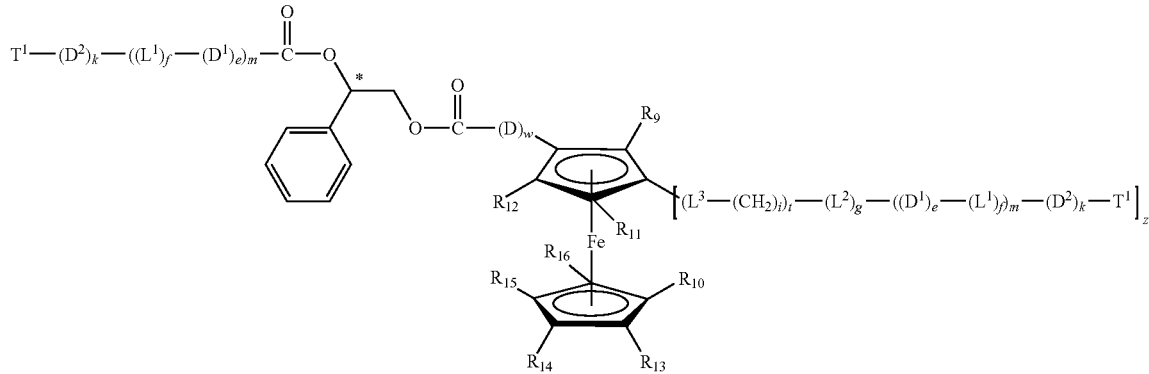

Specific examples of the chiral dopant in the invention are shown below, but the invention is not limited thereto.
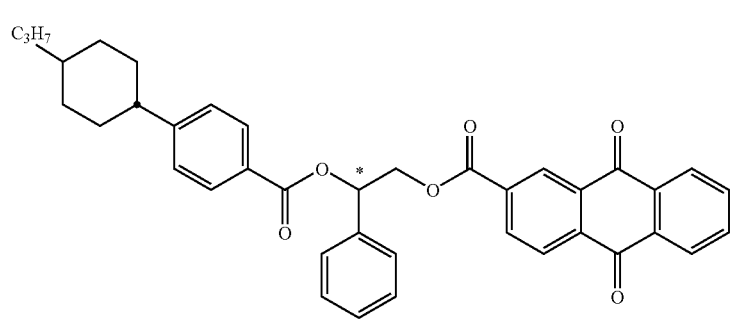
(1)
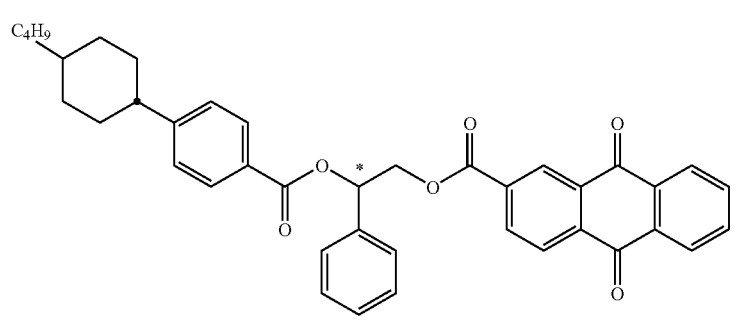
(2)
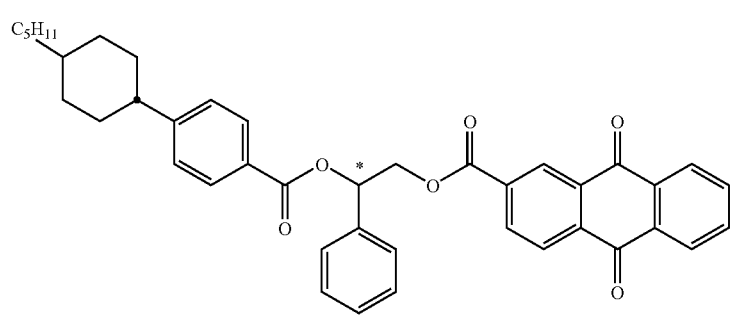
(3)
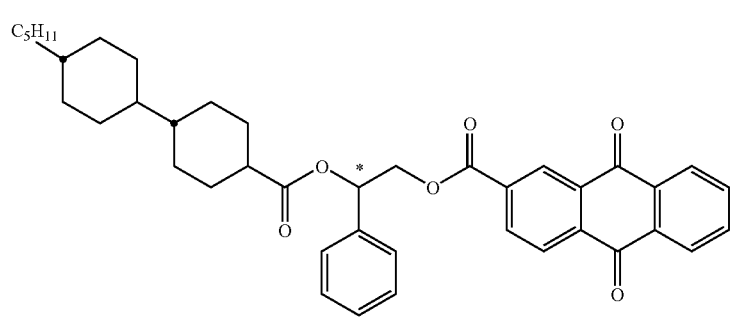
(4)
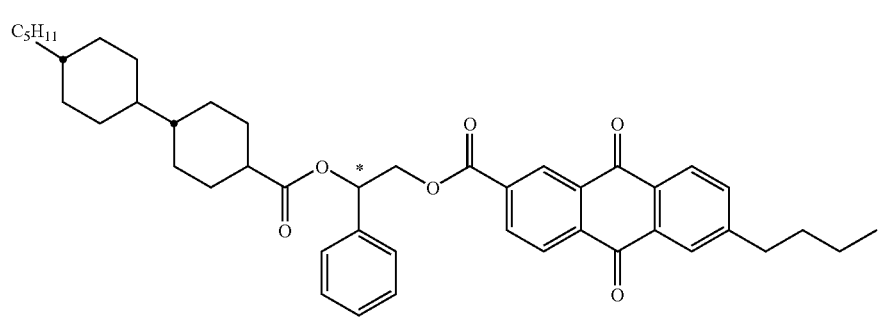
(5)

(6)
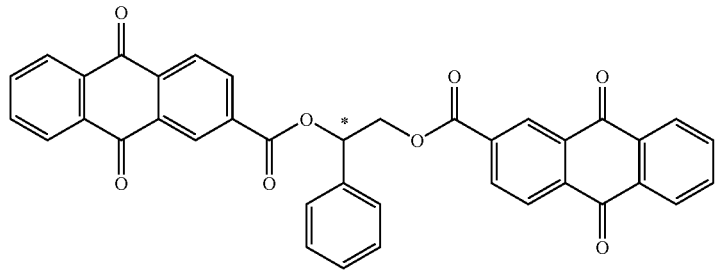
(7)
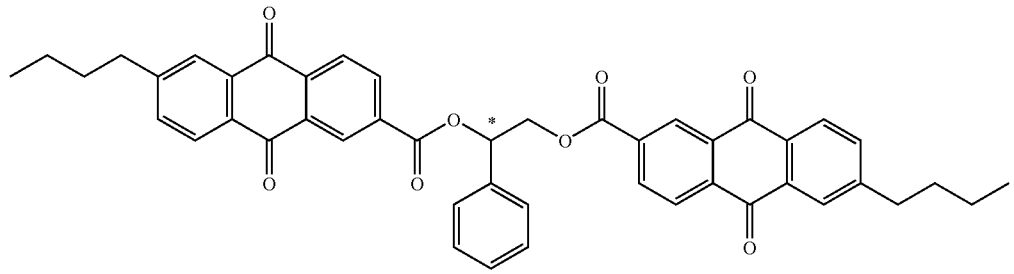
(8)
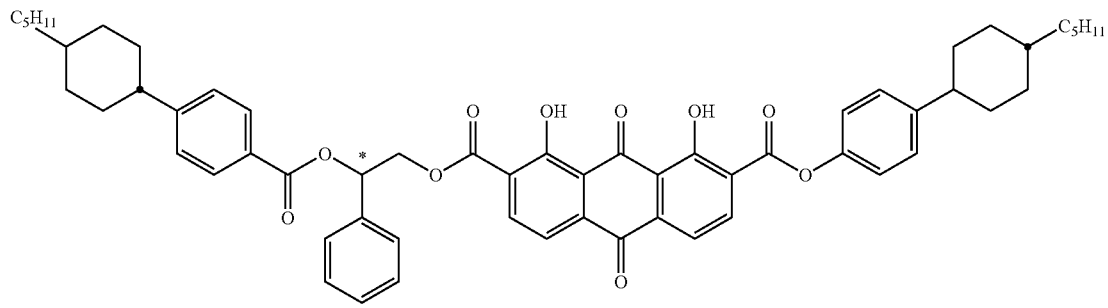
(9)
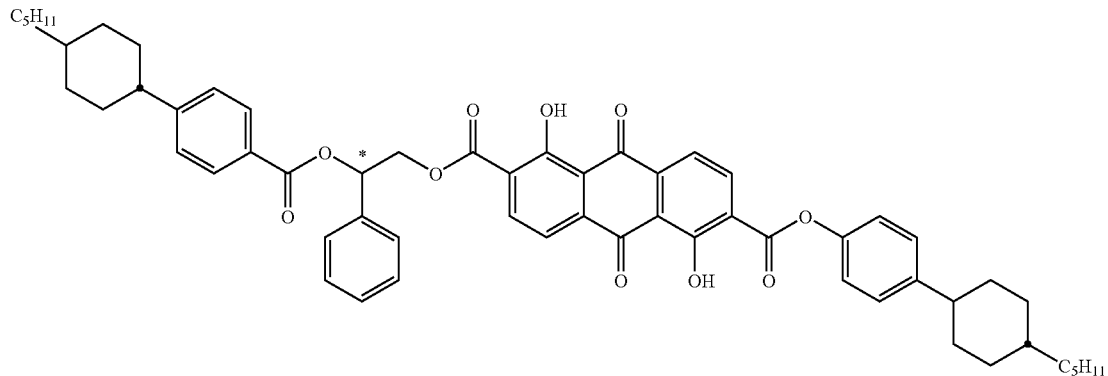
(10)
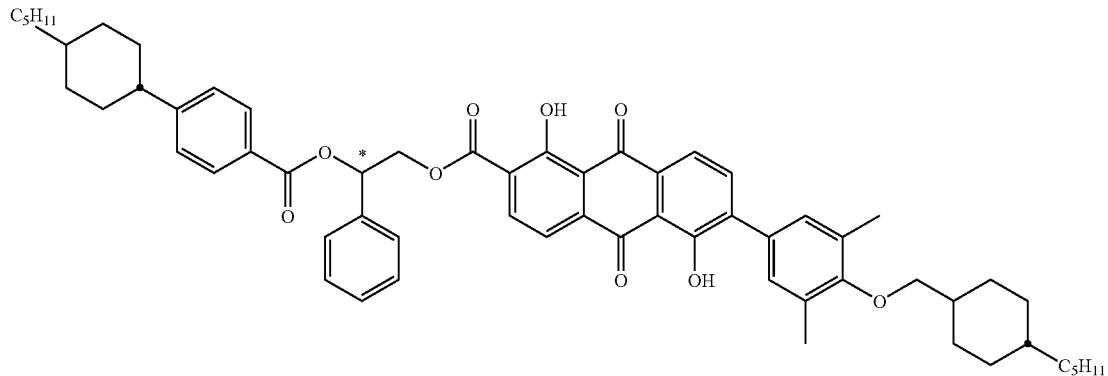

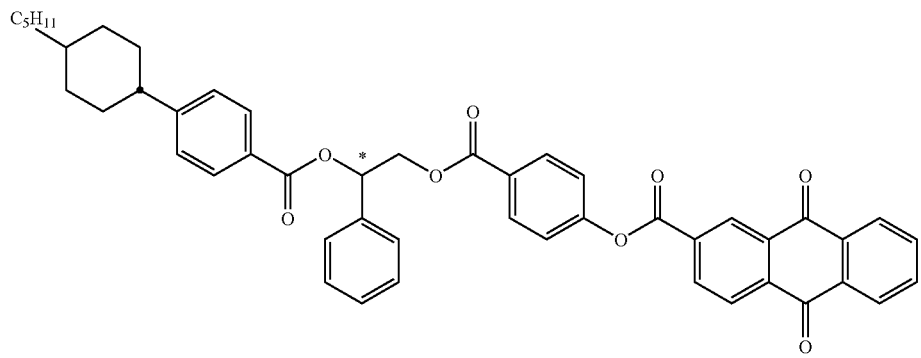
(11)
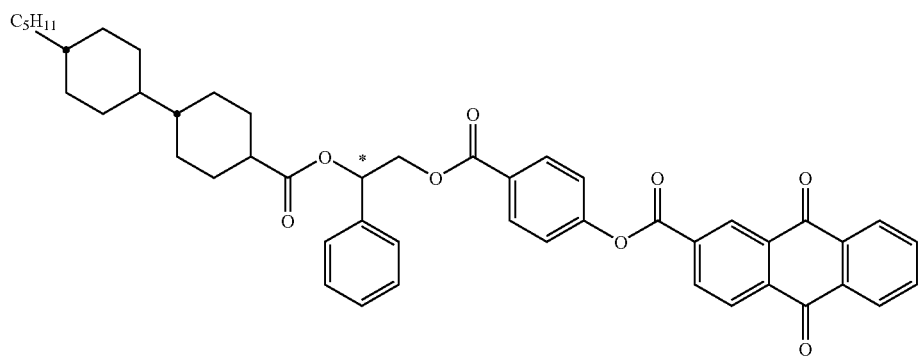
(12)
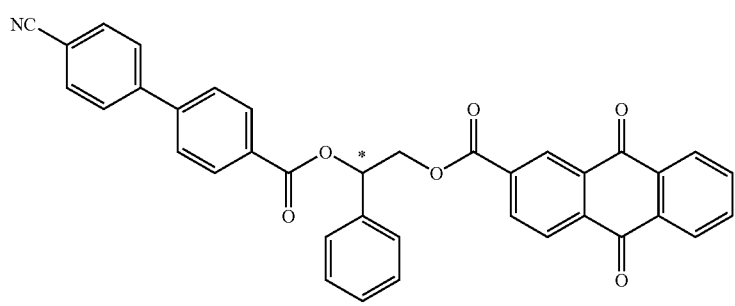
(13)
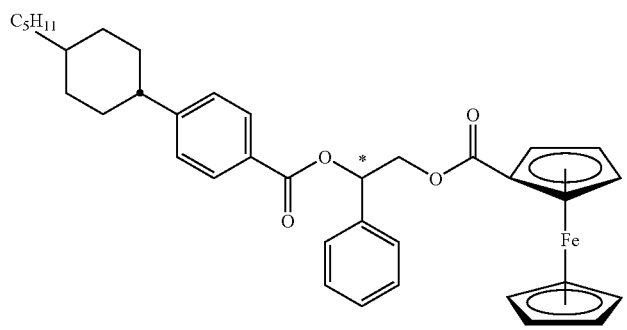
(14)

-continued
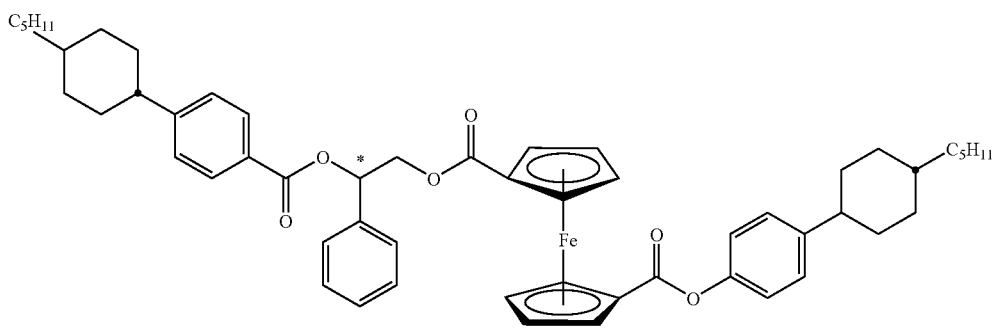
(15)
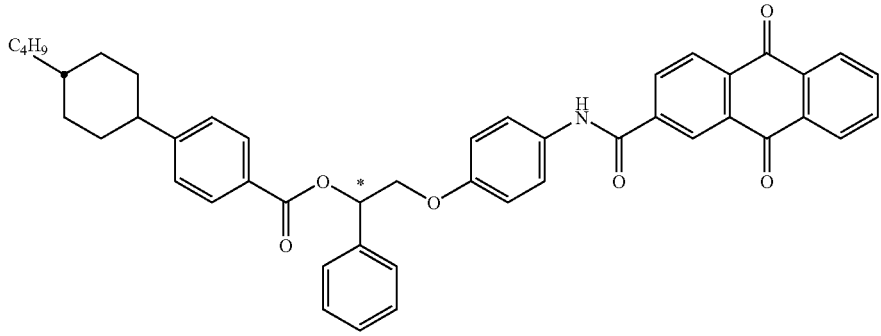
(16)
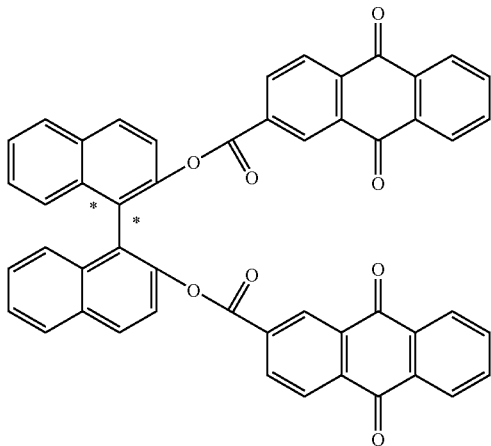
(17)
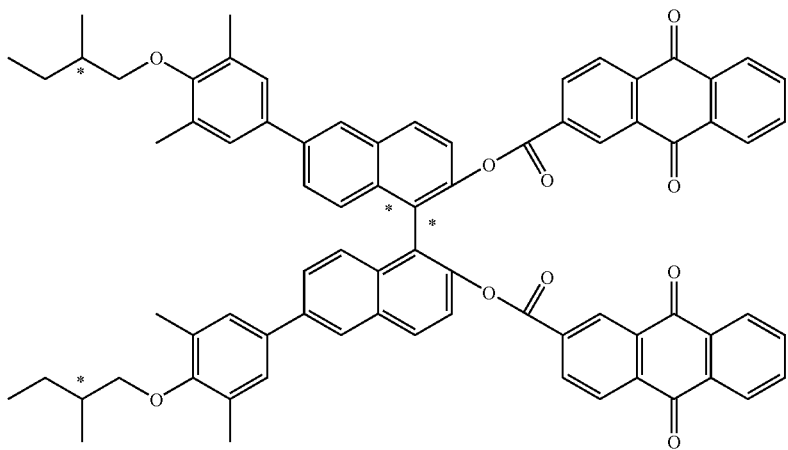
(18)

(19)
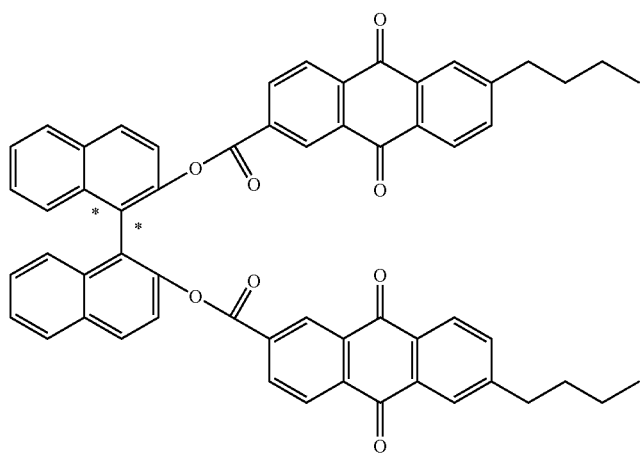
(20)
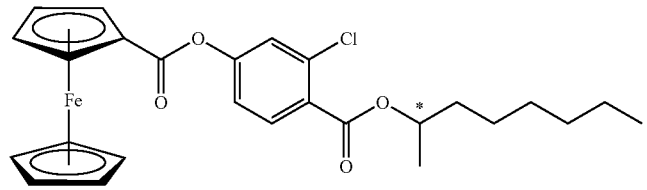
(21)
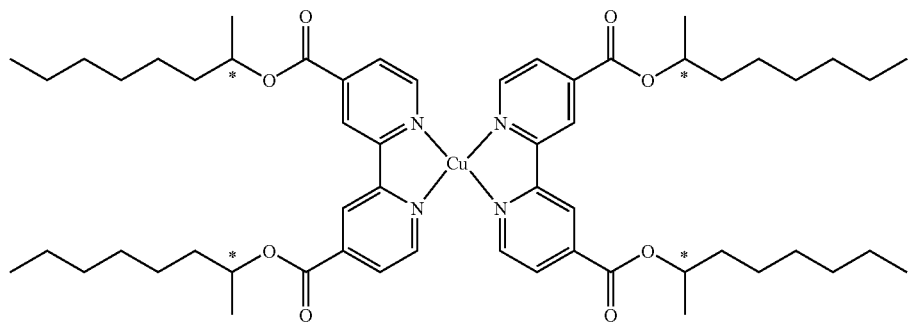
(22)
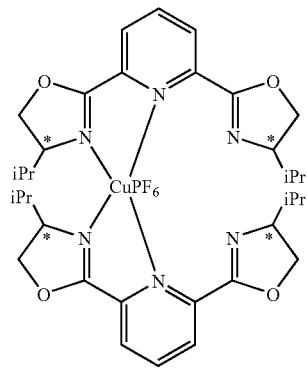
(23)
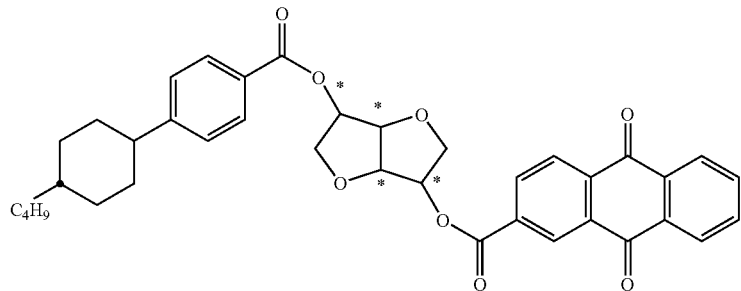

(24)
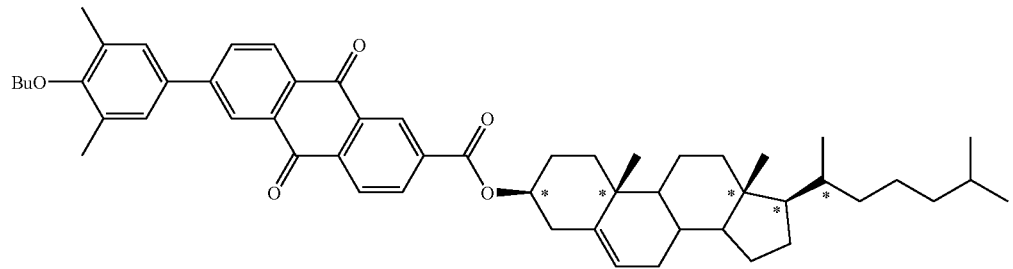
(25)
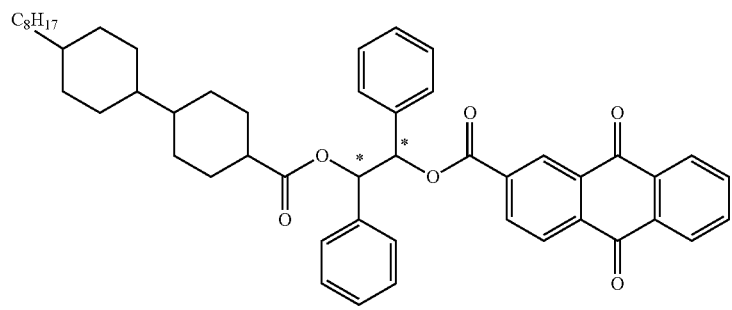
(26)
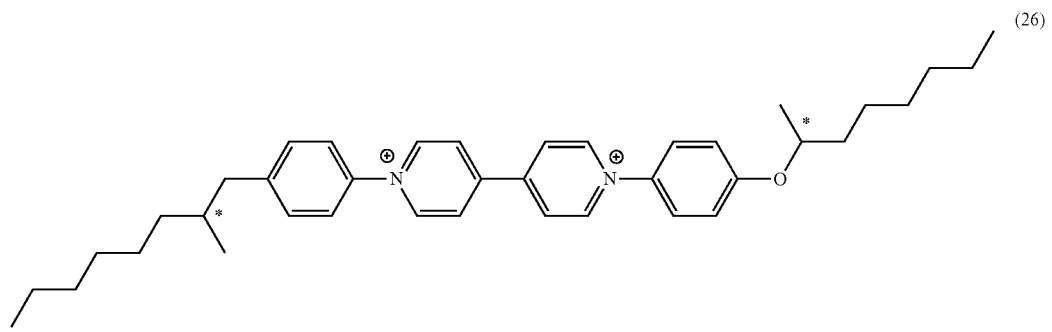
(27)
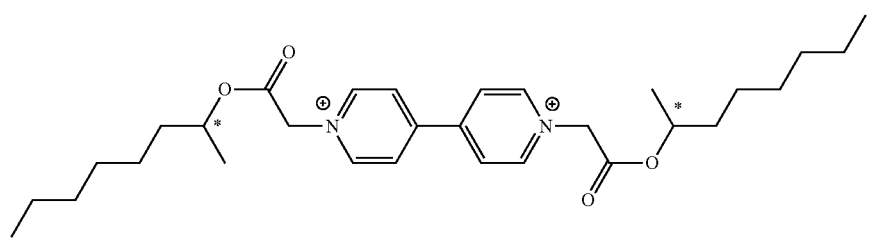
(28)
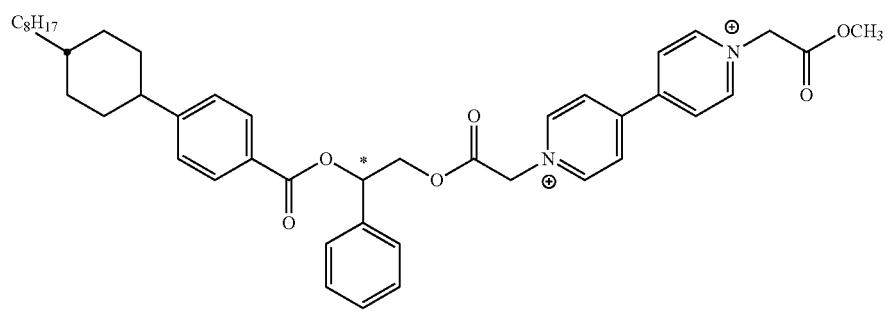

-continued

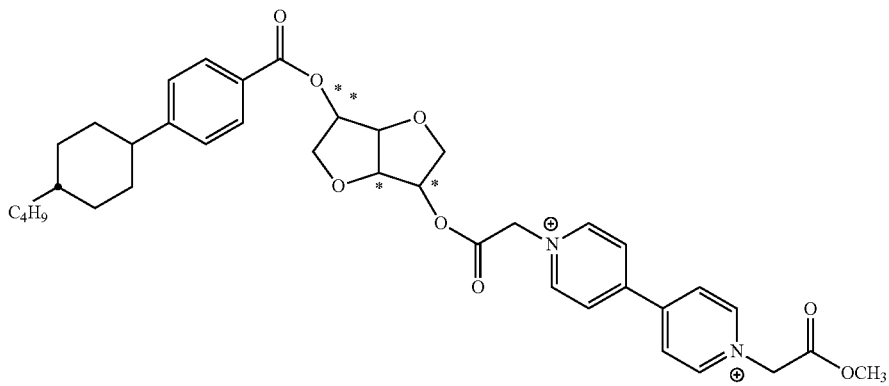

(29)

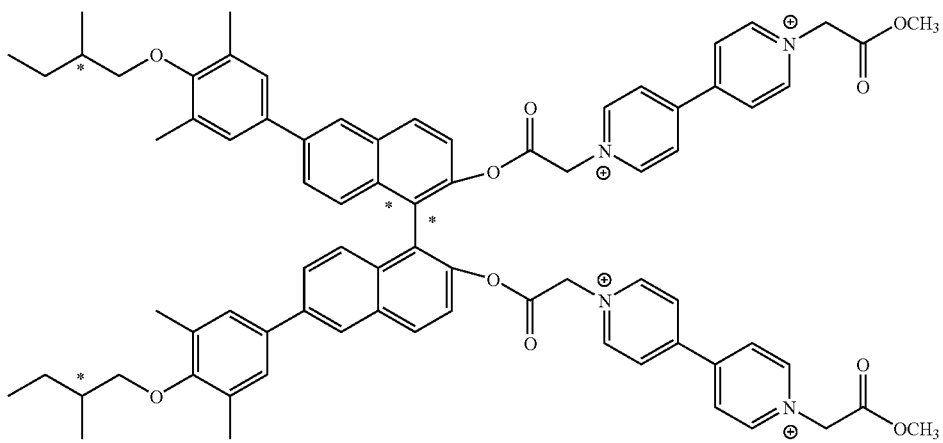

(30)

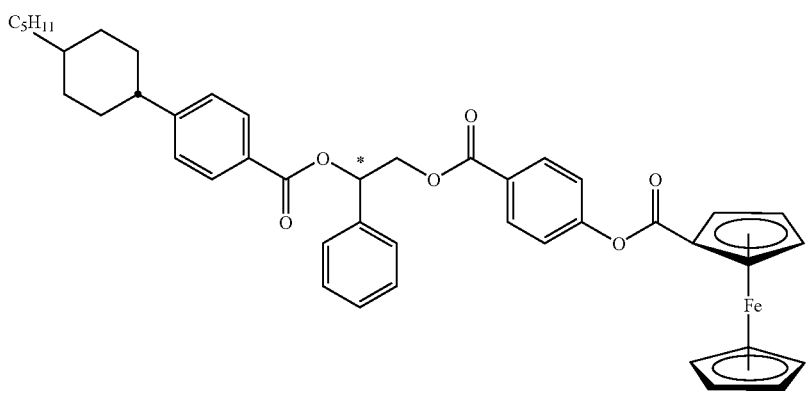

(31)

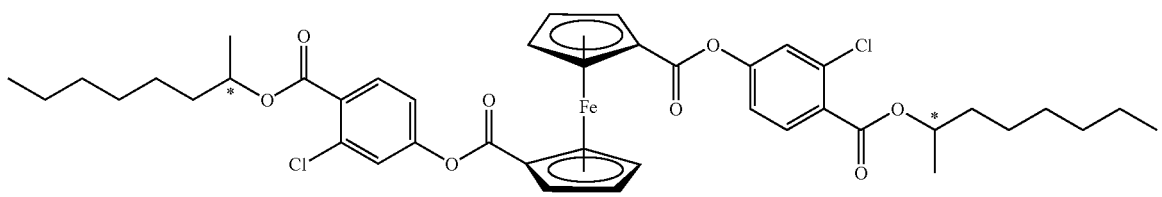

(32)

Besides the chiral dopant represented by the formula (1), another chiral dopant may be added to the liquid crystal composition of the invention. The chiral dopant represented by the formula (1) and another dopant are added in such a ratio that (the chiral dopant represented by the formula (1)): (another dopant), in terms of ratio by weight, is 1:99 to 100:0, more preferably 3:97 to 100:0, even more preferably 3:97 to 99:1, from the viewpoint of increasing the variation width of selective reflection wavelength and from the viewpoint of regulating the selective reflection wavelength in an arbitrary wavelength range.

(Supporting Electrolyte)

The supporting electrolyte in the invention confers electrical conductivity on the liquid crystal composition and realizes a redox reaction. As long as this can be realized, the supporting electrolyte is not particularly limited, and supporting electrolytes (nBu$_4$NPF$_6$, nBu$_4$NBF$_4$, nBu$_4$NClO$_4$), ionic liquids etc. used generally in electrochemistry can be used. The supporting electrolytes are preferably those highly soluble in the host liquid crystal, and for example, a compound formed by combining an ion represented by the following formula (A) with a counterion described later (formula (B)) can be used.

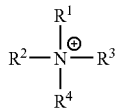

Formula (A)

In the formula (A), R$^1$ to R$^4$ each independently represent a hydrogen atom, an alkyl group (preferably an alkyl group having 1 to 20 carbon atoms). R$^1$ to R$^4$ may if necessary have an unsaturated bond and may be substituted with an oxygen atom, a nitrogen atom, a halogen atom, etc. In particular, an alkyl group having 4 to 18 carbon atoms is preferable.

The counterion is preferably an ion represented by the formula (B).

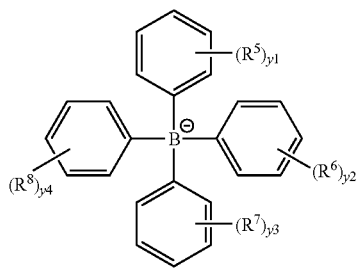

Formula (B)

In the formula (B), R$^5$ to R$^8$ each independently represent a hydrogen atom, a halogen atom, an alkyl group, an aryl group, an alkoxy group, an acyl group, an acyloxy group, an aryloxy group or an amino group.

In the formula (B), y1 to y4 each independently represents an integer of 0 to 5 and is preferably an integer of 0 to 4, more preferably an integer of 0 to 3.

Specific examples of the formulae (A) and (B) include (C$_{12}$H$_{25}$)$_3$NC$_4$H$_9$.BPh$_4$, (C$_{12}$H$_{25}$)$_3$NC$_5$H$_{11}$.BPh$_4$, (C$_{12}$H$_{25}$)$_3$NC$_6$H$_{13}$.BPh$_4$, and the following combination.

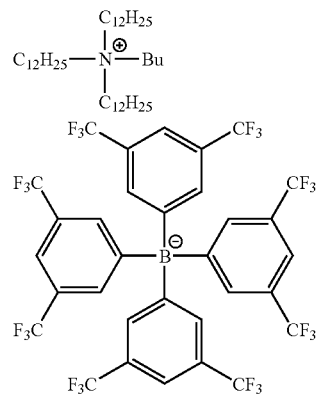

The supporting electrolytes may be used alone or in combination of two or more thereof.

The content of the supporting electrolyte in the liquid crystal composition is preferably 0.1 to 20% by weight, more preferably 0.5% by weight or more, still more preferably 1% by weight or more, further more preferably 2% by weight or more.

(Other Additives)

For the purpose of adjusting physical properties of the host liquid crystal (for example, the temperature range in which the liquid crystal phase appears) to a desirable range or of promoting the redox reaction, a variety of liquid crystal or non-liquid-crystal compounds may be added to the liquid crystal composition of the invention. Compounds such as an UV absorber and an antioxidant may also be contained in the composition.

Examples of the compounds that can be added to the liquid crystal composition include the following compounds.

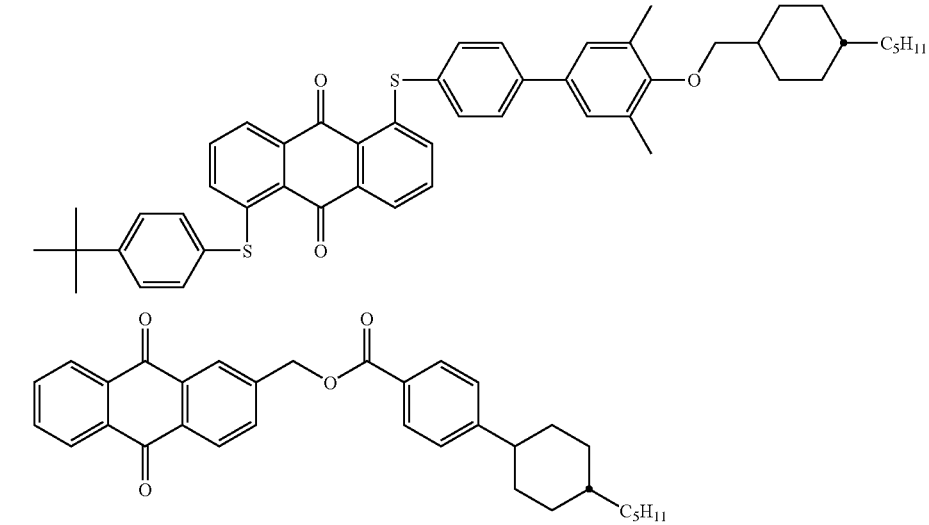

-continued

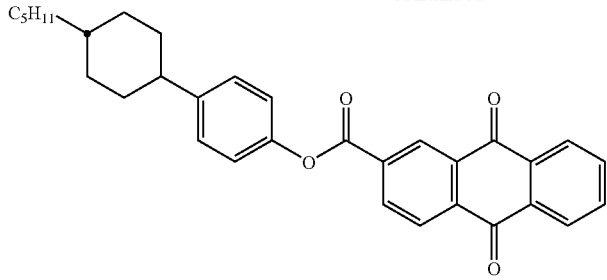 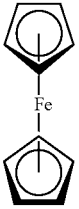

When the above-mentioned compound having an anthraquinone structure, or ferrocene, is added to the composition, an oxidoreduction cycle can rapidly proceed to increase a response speed.

(Physical Properties Etc. of the Liquid Crystal Composition)

The liquid crystal composition of the invention changes selective reflection wavelength by a redox reaction induced by an electric field, preferably by the redox reaction of a dopant, more preferably by the redox reaction of a chiral dopant.

A change in the selective reflection wavelength of the liquid crystal composition using an achiral dopant is generated by change in the concentration of the chiral dopant due to a change in solubility of the dopant or by change in the HTP value of the chiral dopant due to a change in hydrophilicity and hydrophobicity of the host liquid crystal.

A change in the selective reflection wavelength of the liquid crystal composition using the chiral dopant occurs by change in pitch length.

When the change in pitch length occurs by change in the concentration of the chiral dopant, a suitable change in the concentration before and after the redox reaction varies significantly depending on the refractive index of the host liquid crystal and on the HTP and amount of the chiral dopant used, and can thus not be unambiguously determined, but when HTP is 10, the change in the concentration of the dopant is preferably 2 to 30% by weight, more preferably 3 to 27% by weight, and even more preferably 4 to 25% by weight, based on the amount of all the chiral dopants, and when HTP is 30, the change in the concentration is preferably 0.1 to 15% by weight, more preferably 0.3 to 13% by weight, and even more preferably 0.5 to 11% by weight, based on all the chiral dopants. As used herein, all the chiral dopants refer to all chiral dopants contained in the liquid crystal composition and include both the dopant causing oxidoreduction and the dopant not causing oxidoreduction.

When the change in pitch length occurs by change in the HTP value of the chiral dopant, a suitable change in the HTP value before and after the redox reaction varies significantly depending on the refractive index of the host liquid crystal and on the HTP and amount of the chiral dopant used, and can thus not be unambiguously determined, but when the average HTP calculated from the HTP of all chiral dopants is 10, the change in the HTP value is preferably 0.2 to 6, more preferably 0.4 to 5.5, and even more preferably 0.6 to 5, and when the average HTP calculated from the HTP of all chiral dopants is 30, the change in the HTP value is preferably 1 to 20, more preferably 1.5 to 17, and even more preferably 2 to 15. As used herein, all the chiral dopants refer to all chiral dopants contained in the liquid crystal composition and include both the dopant causing oxidoreduction and the dopant not causing oxidoreduction.

The selective reflection wavelength of the liquid crystal composition of the invention is not particularly limited, but is preferably in the range of 200 nm to 1000 nm. For example, when the selective reflection wavelength is in the visible light range, the composition can be used in displays or as a light modulating material, or when the selective reflection wavelength is in the ultraviolet or infrared range, the composition can be used as a light modulating material for regulating ultraviolet or infrared light.

The electric field applied to change the selective reflection wavelength is preferably created by application of a DC voltage, from the viewpoint of passing a current for performing oxidoreduction.

The voltage to be applied is determined according to the redox potential of the dopant used, but from the viewpoint of response time, power consumption and device stability, the voltage to be applied can be suitably regulated depending on the type of the host liquid crystal and the concentration of the supporting electrolyte.

<Liquid Crystal Device>

Hereinafter, the liquid crystal device of the invention will be described.

FIG. 1 is a schematic sectional view showing one example of the liquid crystal device of the invention.

The liquid crystal device of the invention has a pair of electrodes 10 and 12, at least one of which is a transparent electrode, and a liquid crystal layer 14 containing the liquid crystal composition between the electrodes. The liquid crystal device may further have a black plate, an antireflection film, a brightness improving film, etc. (not shown).

The liquid crystal device of the invention can be constituted by placing it between a pair of electrode substrates 16 and 18. Usually, the electrode substrates 16 and 18 used in the liquid crystal device of the invention may be glass or plastic substrates.

The plastic substrate used in the invention includes an acrylic resin, a polycarbonate resin and an epoxy resin, for example, triacetyl cellulose (TAC), polyethylene terephthalate (PET), polyethylene naphthalate (PEN), syndiotactic polystyrene (SPS), polyphenylene sulfide (PPS), polycarbonate (PC), polyarylate (PAr), polysulfone (PSF), polyester sulfone (PES), polyether imide (PEI), cyclic polyolefin, and polyimide (PI). The plastic substrate is preferably triacetyl cellulose (TAC) or polyethylene terephthalate (PET).

The thickness of the plastic substrate is not particularly limited, and is preferably 30 μm to 700 μm, more preferably 40 μm to 200 μm, and even more preferably 50 μm to 150 μm.

In any case, the haze is preferably 3% or less, more preferably 2% or less, and even more preferably 1% or less, and the total luminous transmittance is preferably 70% or more, more preferably 80% or more, and even more preferably 90% or more.

The plastic substrate may contain resin modifiers such as a plasticizer, a dye, a pigment, an antistatic agent, an UV absorber, an antioxidant, inorganic fine particles, a separation promoting agent, a leveling agent and a lubricant, as occasion demands, unless the effects of the invention is impaired.

The plastic substrate may be either light-transmissive or light non-transmissive. In the case of a light non-transmissive substrate, a black substrate having no light reflectivity may be used on a non-display surface. The black substrate is for example a plastic substrate containing an inorganic pigment such as carbon black. The substrate is described in detail, for example, on pages 218 to 231 of Liquid Crystal Device Handbook, edited by Committee 142 of Japan Society for the Promotion of Science, Nikkan Kogyo Shimbunsha, 1989.

Electrode layers 10 and 12 are formed on the surfaces of a pair of substrates 16 and 18, and at least the electrode layer 10 is a transparent electrode. As the electrode layer, indium oxide, indium tin oxide (ITO), tin oxide, PEDOT-PSS, a silver nanorod or a carbon nanotube is used.

The transparent electrode 10 may be one described, for example, on pages 232 to 239 of Liquid Crystal Device Handbook, edited by Committee 142 of Japan Society for the Promotion of Science, Nikkan Kogyo Shimbunsha, 1989.

The transparent electrode 10 may be formed by a sputtering method, a sol-gel method or a printing method.

In the invention, the resistance of the transparent electrode layer 10 is 100Ω/□ or less, preferably 50Ω/□ or less.

The electrode layer 12 which is used, out of a pair of substrates 16 and 18, for the substrate 18 to be paired with the substrate 16 on which the transparent electrode layer 10 was formed may be a transparent electrode layer or a non-transparent electrode layer, and as the non-transparent electrode layer, a GC electrode or the like can be used.

When the liquid crystal device of the invention has such electric conductivity as to allow a redox reaction to occur in the liquid crystal layer, the surface of the substrate in contact with the liquid crystal is preferably provided with a layer subjected to an alignment treatment for the purpose of aligning the liquid crystal (not shown). From the viewpoint of performing reversible oxidoreduction, it is preferable to subject only one side of the pair of substrates to an alignment treatment.

Such alignment treatment is carried out by coating and aligning a quaternary ammonium salt, by coating polyimide and rubbing the surface of the polyimide layer, by oblique vapor deposition of $SiO_2$, or by light irradiation utilizing photoisomerization. Polyimide, a silane coupling agent, polyvinyl alcohol and gelatin are preferably used, among which polyimide and a silane coupling agent are used preferably from the viewpoint of orientation performance, durability, insulation properties, and costs. Polyimide is more preferably used.

In the invention, the thickness of the layer subjected to the alignment treatment is 500 nm or less, preferably 300 nm or less.

The alignment method may or may not involve rubbing treatment. An alignment film may be for example one described on pages 240 to 256 of Liquid Crystal Device Handbook, edited by Committee 142 of Japan Society for the Promotion of Science, Nikkan Kogyo Shimbunsha, 1989.

The liquid crystal device of the invention may be provided with a gap (cell gap) with spacer 20 between the pair of substrates and filled in the gap with the liquid crystal composition. The spacer 20 may be for example one described on pages 257 to 262 of Liquid Crystal Device Handbook, edited by Committee 142 of Japan Society for the Promotion of Science, Nikkan Kogyo Shimbunsha, 1989. The liquid crystal composition of the invention can be arranged in the space between the substrates by applying or printing it on the substrate.

It is known that generally as the helical cycle of the cholesteric liquid crystal having 10 cycles or more, the reflectance is increased. Accordingly, the cell gap is preferably more than 10 times as large as the pitch length of the cholesteric liquid crystal. On the other hand, when the cell gap is too large, liquid-crystal molecular orientation is easily disordered, and it is thus important for the cell gap to have a suitable size.

From the above viewpoint, the cell gap of the liquid crystal device of the invention is 2 to 50 μm, preferably 3 to 40 μm, more preferably 4 to 30 μm.

—Other Members—

Other members include, for example, a barrier film, a UV absorbing layer, an antireflection layer, a hard coat layer, an antifouling layer, an organic interlayer insulation film, a metal reflective plate, a retardation film and an oriented film (not shown). These members may be used alone or in combination of two or more thereof.

The barrier film may be based on an organic polymer, an inorganic material or an organic/inorganic composite. The organic polymer includes ethylene-vinyl alcohol (EVOH), polyvinyl alcohol (PVA/PVOH), nylon MXD6 (N-MXD), and nanocomposite-based nylon. The inorganic material includes silica, alumina, and a binary system. These materials are described in detail in, for example, "Development of High-Barrier Material, Film-Making Technology and Method for Measurement and Evaluation of Barrier Properties" (in Japanese), Gijyutsu Joho Kyokai, 2004.

From the viewpoint of easier production, the barrier layer is arranged preferably on the side of the support on which the transparent electrode is not arranged in the device of the invention.

The UV absorbing layer preferably contains an antioxidant such as 2,2-thiobis(4-methyl-6-t-butylphenol) or 2,6-di-t-butylphenol and an UV absorber such as 2-(3-t-butyl-5-methyl-2-hydroxyphenyl)-5-chlorobenzotriazole or alkoxybenzophenone.

From the viewpoint of easier production, the UV absorbing layer is arranged preferably on the side of the support on which the transparent electrode is not arranged in the device of the invention.

The antireflection film is formed of an inorganic material or an organic material, and the layer may be constituted of a single layer or multiple layers. Alternatively, the antireflection film may have a multilayer structure consisting of an inorganic material layer and an organic material layer. The antireflection film may be arranged on one side or both sides of the pair of substrates. The antireflection films when arranged on both sides may be those that are the same or different in structure. For example, the antireflection film on one side may be a multilayer structure, while the antireflection film on the other side may be a simplified monolayer structure. The antireflection film may be arranged directly on the transparent electrode or the support.

The inorganic material used in the antireflection film includes $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$, and $WO_3$, and these materials may be used alone or in combination of two or more thereof.

Among them, $SiO_2$, $ZrO_2$, $TiO_2$, and $Ta_2O_5$ which can be vacuum-deposited at low temperature are preferable because the support is made of plastics.

The multilayer film formed of an inorganic material is exemplified by a laminate structure that is formed alternately of a highly refractive material layer and a low refractive material layer such that the total optical film thickness of $ZrO_2$ layer and $SiO_2$ layer from the side of the support becomes λ/4, the optical film thickness of $ZrO_2$ layer becomes λ/4 and the optical film thickness of $SiO_2$ layer as the outermost layer becomes λ/4. λ is designed wavelength and is usually 520 nm. The outermost layer is preferably $SiO_2$ because the refractive index is low and the antireflection film can be endowed with mechanical strength.

When the antireflection film is formed of an inorganic material, the film making method that can be used herein includes, for example, a vacuum deposition method, an ion plating method, a sputtering method, a CVD method, and a method of precipitation by a chemical reaction in a saturated solution.

The organic material used in the antireflection film includes, for example, FFP (tetrafluoroethylene-hexafluoropropylene copolymer), PTFE (polytetrafluoroethylene), and ETFE (ethylene-tetrafluoroethylene copolymer) and is selected in consideration of the refractive index of a lens material and a hard coat layer if any thereon. As the film making method, not only the vacuum deposition method but also coating methods excellent in mass productivity, such as a spin coating method or a dip coating method may be used in film making.

As a hard coat layer, a known UV-curable or electron beam-curable acrylic or epoxy resin can be used.

An antifouling layer, a water- and oil-repellent material such as a fluorine-containing organic polymer can be used.

The liquid crystal device of the invention can be driven by a simple matrix driving system or an active matrix driving system using a thin film transistor (TFT) or the like. The driving system used may be one described, for example, on pp. 387-460 of Liquid Crystal Device Handbook, edited by Committee 142 of Japan Society for the Promotion of Science, Nikkan Kogyo Shimbunsha, 1989.

The absolute value of driving voltage in the liquid crystal device of the invention is preferably 0.1 to 20 V, more preferably 0.3 to 15 V, still more preferably 0.5 to 1.0 V.

Now, a toning method in the liquid crystal device of the invention will be described. By way of example, the method will be described with reference to the liquid crystal device using the liquid crystal composition containing a chiral dopant.

The liquid crystal composition containing a chiral dopant and a supporting electrolyte is injected into a counter electrode cell. The electrode cell into which the liquid crystal composition was injected shows selective reflection. Then, a DC voltage higher than the redox potential of the chiral dopant is applied to the electrode cell thereby toning it. The variation width of the selective reflection wavelength can be regulated by changing the application time (by regulating the amount of the chiral dopant reacted), etc.

For returning the selective reflection wavelength to the original, a reversed voltage is applied. For example, when a voltage of −4 V is applied to change the selective reflection wavelength, a voltage of −4 V is applied to return the selective reflection wavelength to the original.

In this manner, the selective reflection wavelength of the liquid crystal composition can be changed.

The liquid crystal device of the invention can be used preferably as a reflective display material or a light modulating material.

The liquid crystal composition of the invention can be used as an optical element described below.

Specific examples of the optical element in the invention include functional films such as a circularly polarized emission film, an optical film, a retardation film, a ferroelectric film, an antiferroelectric film and a piezoelectric film, and functional devices such as a (circularly) polarized emission device, a laser oscillation device by light excitation (based on primary photonic crystal effect) or by electric-field excitation, a backlight for LCD, a nonlinear optical device, an electro-optic device, a pyroelectric device, a piezoelectric device, and a light modulation device.

The optical element of the invention can be produced for example a method 1) wherein the composition of the invention is applied on one support or a pair of supports (cell etc.) and then crosslinked or a method 2) wherein the composition of the invention is injected thereinto as it is.

Exemplary embodiments of the invention are enumerated as follows:

[1] A liquid crystal composition exhibiting selective reflection and changing its selective reflection wavelength by a redox reaction induced by an electric field.

[2] The liquid crystal composition of the above-mentioned [1], wherein the selective reflection wavelength changes by the redox reaction of a dopant induced by an electric field.

[3] The liquid crystal composition of the above-mentioned [1] or [2], wherein the electric field is created by application of a DC voltage.

[4] The liquid crystal composition of the above-mentioned [2] or [3], wherein the redox potential of the dopant is −2.5 V to +2.5 V relative to a reference electrode SCE.

[5] The liquid crystal composition of any one of the above-mentioned [2] to [4], wherein the dopant is a chiral dopant.

[6] The cholesteric liquid crystal composition of the above-mentioned [5], wherein the selective reflection wavelength changes by the redox reaction of the chiral dopant.

[7] The liquid crystal composition of any one of the above-mentioned [1] to [6], wherein the change of the selective reflection wavelength occurs by a change in pitch length.

[8] The liquid crystal composition of the above-mentioned [7], wherein the change in pitch length occurs by a change in the concentration of the chiral dopant.

[9] The liquid crystal composition of the above-mentioned [7], wherein the change in pitch length occurs by a change in the HTP value of the chiral dopant.

[10] The liquid crystal composition of any one of the above-mentioned [5] to [9], which comprises at least one kind of dopant, a supporting electrolyte, and a host liquid crystal.

[11] The liquid crystal composition of any one of the above-mentioned [5] to [10], wherein the total concentration of all chiral dopants including the chiral dopant is 3 to 30% by weight.

[12] The liquid crystal composition of any one of the above-mentioned [9] to [11], wherein the HTP value of the chiral dopant is 1 to 100.

[13] The liquid crystal composition of any one of the above-mentioned [5] to [12], wherein the chiral dopant is a compound represented by the following formula (1):

$$A((L)x\text{-}(D)w\text{-}(Rd)_s\text{-}(B)z)_y \qquad (1)$$

wherein A represents a site having an asymmetric carbon atom; L represents a divalent linking group; Rd represents a site causing a redox reaction; B represents a liquid crystalline substituent; D represents an arylene group; a heteroarylene group or a divalent alicyclic hydrocarbon group; x represents 0 or 1; z represents an integer of 0 to 3; y represents an integer of 1 to 4; w represents 0 or 1; s represents 0 or 1 provided that the total number of Rds is 1 to 4; when z is 2 or more, a plurality of Bs may be the same or different; and when y is 2 or more, a plurality of ((L)x-(D)w-(Rd)$_s$-(B)z) units may be the same or different.

[14] The liquid crystal composition of any one of the above-mentioned [10] to [13], which comprises 0.1 to 20% by weight of the supporting electrolyte.

[15] A liquid crystal device having:
a pair of electrodes, at least one of which is a transparent electrode, and
a liquid crystal layer containing the liquid crystal composition of any one of the above-mentioned [1] to [14] positioned between the electrodes.

[16] The liquid crystal device of claim 15, which comprises a polyimide film on at least one of the electrodes.

[17] The liquid crystal device of claim 15 or 16, wherein the driving voltage is 0.1 to 20 V.

[18] The liquid crystal device of any one of the above-mentioned [15] to [17], wherein the resistance of the transparent electrode is 100Ω/☐ or less.

[19] The liquid crystal device of any one of the above-mentioned [15] to [18], wherein a gap between the pair of electrodes is 2 to 50 μm.

[20] A reflective display material comprising the liquid crystal device of any one of the above-mentioned [15] to [19].

[21] A light modulating material comprising the liquid crystal device of any one of the above-mentioned [15] to [19].

EXAMPLES

The present invention will be described in more detail with reference to the Examples, but these examples are merely illustrative of the invention and are not intended to limit the invention.

Example 1

The chiral dopants in the invention can be synthesized in the following manner.
(Synthesis of Chiral Dopant (3))
Chiral dopant (3) was synthesized according to the following scheme:

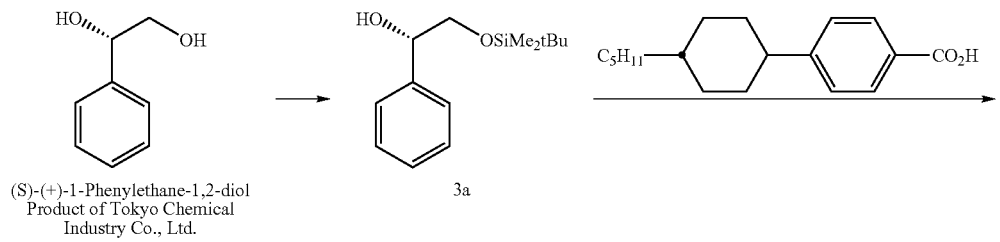

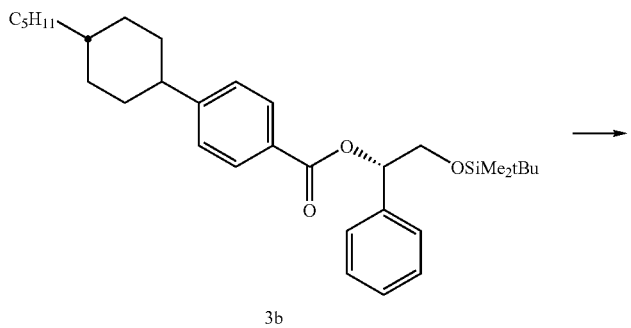

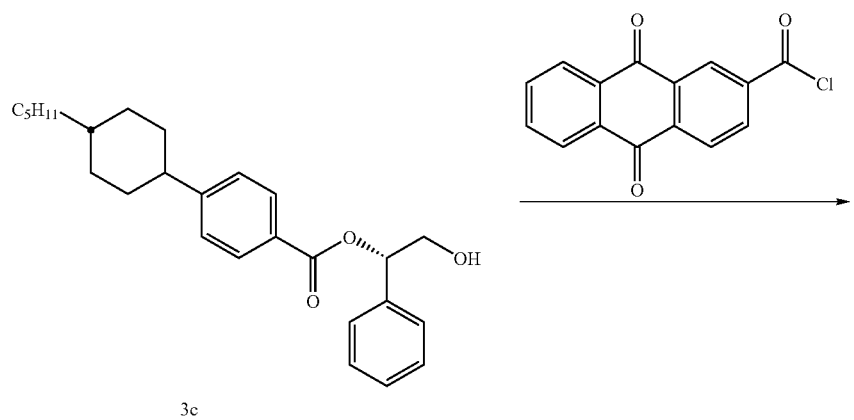

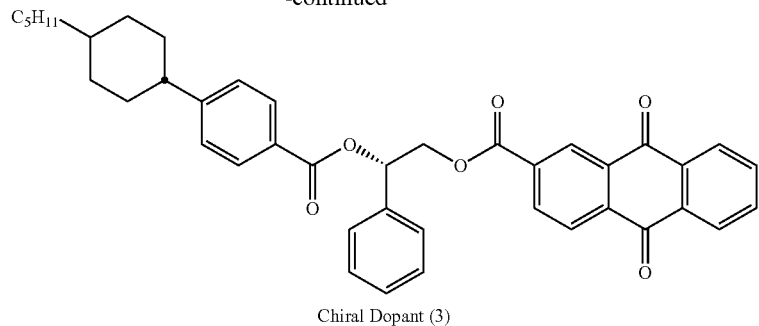

Chiral Dopant (3)

(Synthesis of Compound 3a)

Triethylamine (8.9 g) was added dropwise to a solution of (s)-(+)-phenylethane-1,2-diol (manufactured by Tokyo Chemical Industry Co., Ltd.) (11.1 g), dimethylaminopyridine (manufactured by Wako Pure Chemical Industries, Ltd.) (10.2 g) and t-butyldimethylsilyl chloride (manufactured by Tokyo Chemical Industry Co., Ltd.) (13.3 g) in methylene chloride (200 mL) under cooling on ice and stirred for 1 hour at room temperature. The mixture was heated under reflux with stirring for 3 hours, and the reaction solution was poured into ethyl acetate/1 N aqueous hydrochloric acid, and the organic layer was washed with 1 N aqueous hydrochloric acid, then dried over magnesium sulfate and then concentrated under reduced pressure. The concentrated residue was purified by silica gel chromatography (developing solvent: ethyl acetate/hexane=1/7), to give Compound 3a (15.4 g).

(Synthesis of Compounds 3b and 3c)

A solution of dicyclohexyl carbodiimide (11.8 g) in methylene chloride (30 mL) was added dropwise to a solution of Compound 3a (12.0 g), trans-4-pentylcyclohexylbenzoic acid (13.0 g) and dimethylaminopyridine (3.5 g) in methylene chloride (400 mL) and heated under reflux with stirring for 2 hours. The reaction solution was poured into ethyl acetate/1 N aqueous hydrochloric acid and then filtered, and the organic layer was washed with 1 N aqueous hydrochloric acid, dried over magnesium sulfate and then concentrated under reduced pressure, to give a crude product of Compound 3b.

1 M TBAF solution in THF (48 mL) was added to a solution of the crude product of Compound 3b in THF (50 mL) under cooling on ice and stirred for 3 hours. The reaction solution was poured into ethyl acetate/1 N aqueous hydrochloric acid and then filtered, and the organic layer was washed with 1 N aqueous hydrochloric acid, dried over magnesium sulfate and then concentrated under reduced pressure, and the concentrated residue was purified by silica gel chromatography (developing solvent: ethyl acetate/hexane=1/5), to give Compound 3c (13.1 g).

(Synthesis of Chiral Dopant (3))

A solution of dicyclohexyl carbodiimide (0.32 g) in methylene chloride (5 mL) was added dropwise to a solution of Compound 3c (0.5 g), anthraquinone-2-carboxylic acid (manufactured by Tokyo Chemical Industry Co., Ltd.) (0.34 g) and dimethylaminopyridine (97 mg) in methylene chloride (20 mL) and heated under reflux with stirring for 2 hours. The reaction solution was poured into ethyl acetate/1 N aqueous hydrochloric acid and then filtered, and the organic layer was washed with 1 N aqueous hydrochloric acid, dried over magnesium sulfate and then concentrated under reduced pressure.

The concentrated residue was purified by silica gel chromatography (developing solvent: ethyl acetate/hexane=1/4), and the resulting crude crystals were recrystallized from isopropyl alcohol, to give chiral dopant (3) (0.62 g).

Exemplary compound (3) was identified by elemental analysis and from NMR and MASS spectra. The compound was a pale yellow to white solid in appearance.

$^1$H-NMR (CDCl$_3$)

δ: 0.82-0.94 (3H, t), 0.94-1.14 (2H, m), 1.15-1.51 (11H, m), 1.78-1.92 (4H, d), 2.42-2.56 (1H, ddd), 4.705 (1H, dd), 4.775 (1H, dd), 6.48 (1H, dd), 7.23 (2H, d), 7.34-7.48 (3H, m), 7.53-7.59 (2H, m), 7.81-7.88 (1H, m), 7.84 (1H, d), 7.91 (2H, d), 8.30-8.39 (2H, m), 8.39 (1H, d), 8.47 (1H, dd), 9.01 (1H, sd)

Exemplary compounds (1), (2), (4), (11), (12), (14), (20), (22) and (31) can also be synthesized in analogous manner. $^1$H-NMR data on the exemplary compounds (1), (2), (4), (11), (12), (14) and (31) are shown below.

Compound (1)

$^1$H-NMR (CDCl$_3$)

δ: 0.89 (3H, t), 0.93-1.13 (2H, m), 1.15-1.52 (7H, m), 1.80-1.91 (4H, d), 2.50 (1H, ddd), 4.705 (1H, dd), 4.775 (1H, dd), 6.48 (1H, dd), 7.23 (2H, d), 7.35-7.47 (3H, m), 7.53-7.59 (2H, m), 7.82-7.88 (2H, m), 7.92 (2H, d), 8.31-8.39 (2H, m), 8.39 (1H, d), 8.47 (1H, dd), 9.01 (1H, sd)

Compound (2)

$^1$H-NMR (CDCl$_3$)

δ: 0.90 (3H, t), 0.94-1.13 (2H, m), 1.13-1.52 (9H, m), 1.80-1.91 (4H, d), 2.49 (1H, ddd), 4.705 (1H, dd), 4.775 (1H, dd), 6.48 (1H, dd), 7.23 (2H, d), 7.35-7.48 (3H, m), 7.53-7.59 (2H, m), 7.81-7.88 (2H, m), 7.91 (2H, d), 8.30-8.39 (2H, m), 8.39 (1H, d), 8.47 (1H, dd), 9.01 (1H, sd)

Compound (4)

$^1$H-NMR (CDCl$_3$)

δ: 0.72-1.43 (21H, m), 1.52-18.0 (7H, m), 1.85-2.00 (2H, m), 2.21 (1H, ddd), 4.475 (1H, dd), 4.54 (1H, dd), 6.33 (1H, dd), 7.35-7.45 (3H, m), 7.47-7.53 (2H, m), 7.82-7.89 (2H, m), 8.32-8.39 (2H, m), 8.41 (1H, d), 8.47 (1H, dd), 9.00 (1H, sd)

Compound (11)

$^1$H-NMR (CDCl$_3$)

δ: 0.82-0.94 (3H, t), 0.94-1.14 (2H, m), 1.15-1.53 (11H, m), 1.80-1.92 (4H, d), 2.50 (1H, ddd), 4.67 (1H, dd), 4.76 (1H, dd), 6.41 (1H, dd), 7.26 (2H, d), 7.33-7.46 (5H, m), 7.50-7.57 (2H, m), 7.83-7.90 (2H, m), 7.92 (2H, d), 8.22 (2H, d), 8.33-8.43 (2H, m), 8.48 (1H, d), 8.59 (1H, dd), 9.13 (1H, sd)

Compound (12)

$^1$H-NMR (CDCl$_3$)

δ: 0.73-1.45 (21H, m), 1.50-1.82 (7H, m), 1.86-2.01 (2H, m), 2.21 (1H, ddd), 4.405 (1H, dd), 4.55 (1H, dd), 6.27 (1H, dd), 7.32-7.50 (7H, m), 7.83-7.91 (2H, m), 8.21 (2H, d), 8.33-8.42 (2H, m), 8.48 (1H, d), 8.59 (1H, dd), 9.14 (1H, sd)

Compound (14)

$^1$H-NMR (CDCl$_3$)

δ: 0.82-0.93 (3H, t), 0.93-1.13 (2H, m), 1.15-1.61 (11H, m), 1.78-1.90 (4H, d), 2.40-2.54 (1H, ddd), 4.04 (5H, s), 4.37-4.42 (2H, dd), 4.54-4.62 (1H, dd), 4.68-4.78 (1H, dd), 4.82-4.87 (2H, ddd), 6.26-6.32 (1H, dd), 7.21-7.29 (2H, d), 7.32-7.46 (3H, m), 7.50-7.57 (2H, d), 7.92-7.98 (2H, d)

Compound (31)

$^1$H-NMR (CDCl$_3$)

δ: 0.82-0.94 (3H, t), 0.94-1.14 (2H, m), 1.15-1 57 (11H, m), 1.80-1.94 (4H, d), 2.42-2.56 (1H, ddd), 4.30 (5H, s), 4.51 (2H, dd), 4.60-4.78 (2H, m), 4.96 (2H, ddd), 6.35-6.42 (1H, dd), 7.20-7.30 (5H, dd), 7.32-7.45 (3H, m), 7.48-7.57 (2H, d), 7.86-7.98 (2H, d), 8.15-8.21 (2H, d)

Example 2

Measurement of HTP Value

Each of the chiral dopants (1 mg) in the invention was mixed with host liquid crystal ZLI-2806 (99 mg) (manufactured by Merck), then heated on a hot plate at 120° C. for 10 minutes, then cooled to room temperature, and left overnight in a stationary state, thereby preparing a cholesteric liquid crystal composition. The resulting liquid crystal composition was injected into a wedge-shaped liquid crystal cell (gap 1.1 mm, manufactured by EHC) and observed for its interference fringe under a polarization microscope, thereby determining the pitch length to calculate the HTP value (helical twisting power). The results are shown in Table 1 below.

The HTP value is indicative of the twisting power of the chiral agent toward the host liquid crystal, which can be calculated using the following equation.

HTP=1/($P$×$C$)

($P$: pitch length, $C$: the content of the chiral dopant)

TABLE 1

| Chiral Agent of the Invention | HTP Value |
| --- | --- |
| 1 | 10.1 |
| 2 | 9.7 |
| 3 | 9.5 |
| 4 | 4.0 |
| 11 | 20.0 |
| 12 | 31.2 |
| 14 | 5.5 |
| 20 | 5.4 |
| 22 | 34.0 |
| 31 | 26.6 |

Example 3

Measurement of Redox Potential

A solution of 1 mM exemplary compound (chiral dopant) described above and 0.1 M tetrabutylammonium hexafluorophosphate as a supporting electrolyte in NMP was subjected to bubbling with Ar for 5 minutes and then subjected to cyclic voltammetry with a potentiostat (660C manufactured by BAS). Table 2 below shows the results of redox potentials 1 and 2 wherein a working electrode Pt, a counter electrode Pt and a reference electrode SCE were used.

TABLE 2

| Chiral Dopant | Redox Potential 1 | Redox Potential 2 |
| --- | --- | --- |
| 3 | −0.62 V | −1.39 V |
| 21 | −1.59 V | −2.13 V |
| 22 | (−0.94 V) | −2.01 V |
| 31 | (+0.47 V) | +0.84 V |
| 32 | +0.48 V | No |

Numerical value in parentheses indicates a small peak.

Example 4

Change 1 in Selective Reflection Wavelength by Redox Reaction (Preparation of Liquid Crystal Composition 1)

As the dopant, 1.6 mg chiral dopant (14), 2.0 mg of anthraquinone dye (A-1) below and 2.34 mg of a supporting electrolyte (C$_{12}$H$_{25}$)$_3$NC$_4$H$_9$.BPh$_4$ were dissolved at 120° C. in a cholesteric liquid crystal consisting of 86.1 mg of host liquid crystal ZLI-2806 (manufactured by Merck), 4.0 mg of chiral dopant R-811 exhibiting no redox reaction (manufactured by Merck) and 4.0 mg R-1011 (manufactured by Merck), to prepare a liquid crystal composition 1.

Anthraquinone Dye (A-1)

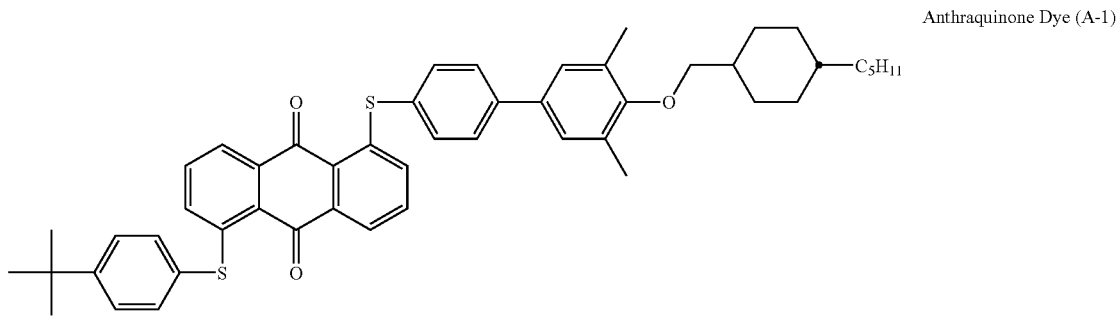

(Preparation of Liquid Crystal Device 1)

The liquid crystal composition 1 was injected into a liquid crystal cell manufactured by E.H.C. Inc. to prepare a liquid crystal device 1. The liquid crystal cell manufactured by E.H.C. Inc. is a liquid crystal cell with an epoxy resin seal, having an ITO transparent electrode (<10Ω/□) and a cell gap of 15 μm.

(Evaluation of the Device)

A DC voltage of 4 V, 3 A, was applied for 1 minute to the prepared liquid crystal device 1, and its transparent wavelength change was measured with a UV-visible spectrophotometer (UV2400) manufactured by Shimadzu Corporation, and as a result, a peak corresponding to the selective reflection wavelength of the liquid crystal composition was changed from 840 nm to 810 nm. At this time, the pitch length was changed from 0.56 μm to 0.54 μm.

Example 5

Change 2 in Selective Reflection Wavelength by Redox Reaction (Preparation of Liquid Crystal Composition 2)

As the dopant, 2.0 mg chiral dopant (3) and 2.9 mg of a supporting electrolyte $(C_{12}H_{25})_3NC_4H_9 \cdot BPh_4$ were dissolved at 120° C. in a cholesteric liquid crystal consisting of 87.1 mg of host liquid crystal ZLI-2806 (manufactured by Merck), 4.0 mg of chiral dopant R-811 exhibiting no redox reaction (manufactured by Merck) and 4.0 mg R-1011 (manufactured by Merck), to prepare a liquid crystal composition 2.

(Preparation of Liquid Crystal Device 2)

The liquid crystal composition 2 was injected into a liquid crystal cell manufactured by E.H.C. Inc. to prepare a liquid crystal device 2. The liquid crystal cell manufactured by E.H.C. Inc. is a liquid crystal cell with an epoxy resin seal, having an ITO transparent electrode (<10Ω/□) and a cell gap of 10 μm.

(Evaluation of the Device)

A DC voltage of 4 V, 3 A, was applied for 1 minute to the prepared liquid crystal device 2, and its transparent wavelength change was measured with a multi-channel spectrometer USB-2000 (manufactured by Ocean Optics, Inc.), and as a result, a peak corresponding to the selective reflection wavelength of the liquid crystal composition was changed from 764 nm to 826 nm. At this time, the pitch length was changed from 0.51 μm to 0.55 μm.

As can be seen from the above results, the chiral dopant is subjected to a redox reaction, thereby changing the pitch length and changing the selective reflection wavelength. Even when light is made incident in an oblique direction and the substrate is rotated, uniform reflectance is exhibited (visual field is not limited), and the reflection in a direction normal to the substrate against light incident in the normal direction showed highest reflectance, and thus it is evident that the change in selective reflection wavelength is not due to the inclination of the helical axis.

Example 6

Regulation of Selective Reflection Wavelength by Voltage (Preparation of Liquid Crystal Composition 3)

As the dopant, 0.59 mg ferrocene, 2.0 mg chiral dopant (3) and 2.9 mg of a supporting electrolyte $(C_{12}H_{25})_3NC_4H_9 \cdot BPh_4$ were dissolved at 120° C. in a cholesteric liquid crystal consisting of 86.6 mg of host liquid crystal ZLI-2806 (manufactured by Merck), 4.0 mg of chiral dopant R-811 exhibiting no redox reaction (manufactured by Merck) and 4.0 mg R-1011 (manufactured by Merck), to prepare a liquid crystal composition 3.

(Preparation of Liquid Crystal Device 3)

The liquid crystal composition 3 was injected into a liquid crystal cell manufactured by E.H.C. Inc. to prepare a liquid crystal device 3. The liquid crystal cell manufactured by E.H.C. Inc. is a liquid crystal cell with an epoxy resin seal, having an ITO transparent electrode (<10Ω/□) and a cell gap of 10 μm.

(Evaluation of the Device)

A DC voltage was applied for 1 minute to the prepared liquid crystal device 3, and its transparent wavelength change was measured with a multi-channel spectrometer USB-2000 (manufactured by Ocean Optics, Inc.). The results of change in peak corresponding to the selective reflection wavelength of the liquid crystal composition are shown in Table 3 below.

TABLE 3

| Applied Voltage (3 A) | Wavelength before Application | Wavelength after Application |
| --- | --- | --- |
| 4 V | 746 nm | 781 nm |
| 6 V | 746 nm | 791 nm |
| 8 V | 746 nm | 799 nm |

From the above results, it can be seen that by regulating the voltage applied, the change in selective reflection wavelength can be regulated.

Example 7

Evaluation of Response Speed (Preparation of Liquid Crystal Devices 4 and 5)

The liquid crystal compositions 2 and 3 prepared in Examples 5 and 6 were injected into liquid crystal cells manufactured by E.H.C. Inc. respectively to prepare liquid crystal devices 4 and 5. The liquid crystal cell manufactured by E.H.C. Inc. is a liquid crystal cell with an epoxy resin seal, having an ITO transparent electrode (<10Ω/□) and a cell gap of 15 μm.

(Evaluation of the Devices)

The response speed was compared between the prepared liquid crystal devices 4 and 5. The response speed was evaluated by applying a DC voltage of 4 V, 3 A and measuring a change in selective reflection wavelength with a multi-channel spectrometer USB-2000 (manufactured by Ocean Optics, Inc.). The time required for the selective reflection wavelength to change by 20 nm is shown in Table 4 below.

TABLE 4

| Liquid Crystal Device | Time | Remark |
| --- | --- | --- |
| 4 | 43 seconds | Without ferrocene |
| 5 | 18 seconds | With ferrocene |

As can be seen from the above results, the response speed can be increased by adding ferrocene.

Example 8

Change in Selective Reflection Wavelength in the Visible Range (Preparation of Liquid Crystal Composition 4)

As the dopant, 1.5 mg of the exemplary compound (chiral dopant) (3), 1.5 mg of the exemplary compound (chiral dopant) (2) and 4.3 mg of a supporting electrolyte $(C_{12}H_{25})_3NC_4H_9 \cdot BPh_4$ were dissolved at 120° C. in a cholesteric liquid composition consisting of 86.1 mg of host liquid crystal ZLI-2806 (manufactured by Merck), 2.2 mg of chiral dopant R-1011 exhibiting no redox reaction (manufactured by Merck), 2.2 mg of chiral agent (B-1) below and 2.2 mg of chiral agent (B-2) below, to prepare a liquid crystal composition 4.

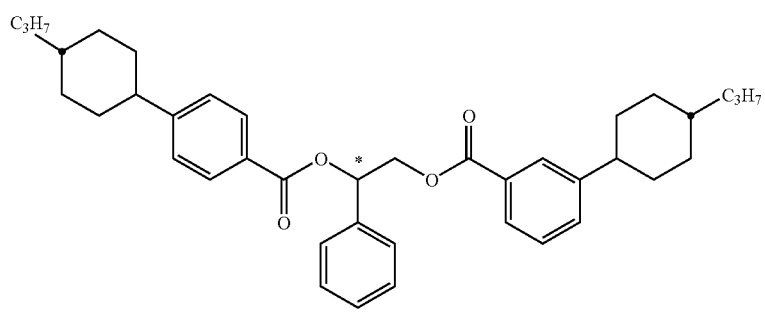

Chiral Agent (B-1)

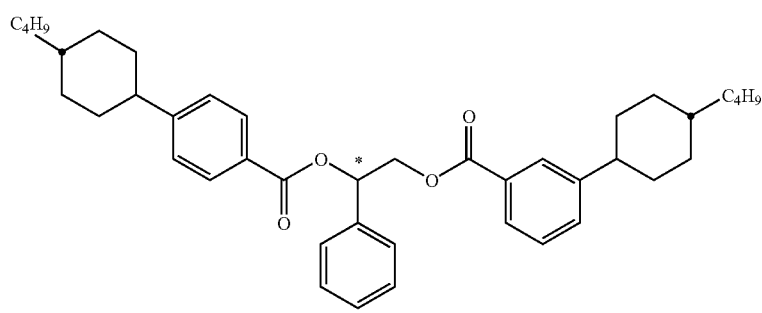

Chiral Agent (B-2)

(Preparation of Liquid Crystal Device 6)

The liquid crystal composition 4 was injected into a liquid crystal cell manufactured by E.H.C. Inc. to prepare a liquid crystal device 6. The liquid crystal cell manufactured by E.H.C. Inc. is a liquid crystal cell with an epoxy resin seal, having an ITO transparent electrode (<10Ω/□) and a cell gap of 15 μm.

(Evaluation of the Device)

A DC voltage of 4 V, 3 A, was applied for 2 minutes to the prepared liquid crystal device 6, and its transparent wavelength change was measured with a multi-channel spectrometer USB-2000 (manufactured by Ocean Optics, Inc.), and as a result, a peak corresponding to the selective reflection wavelength of the liquid crystal composition was changed from 545 nm to 620 nm. The pitch length was changed from 0.36 μm to 0.41 μm. It could also be visually confirmed that the composition was changed from green to red.

Example 9

Reversible Response (Preparation of Liquid Crystal Device 7)

A horizontally oriented film SE-6414 (manufactured by Nissan Chemical Industries, Ltd.) was applied and burned on an ITO glass substrate (manufactured by IGC) to prepare a surface-treated substrate 1. A cell in which a polystyrene spacer (Sekisui Chemical Co., Ltd.) was inserted with a cell gap of 15 μm into the space between the surface-treated substrate 1 and an oriented film-free ITO glass substrate was prepared. The liquid crystal composition 4 was injected into the cell to prepare a liquid crystal device 7.

(Evaluation of the Device)

A DC voltage of 4 V, 3 A, was applied for 1 minute to the prepared liquid crystal device 7, and its selective reflection wavelength change was confirmed with a multi-channel spectrometer USB-2000 (manufactured by Ocean Optics, Inc.), and thereafter when a reversed DC voltage of −4V, 3 A was applied for 1 minute thereto, the selective reflection wavelength was returned to the original wavelength.

Example 10

Surface Treatment with Silane Coupling Agent (Preparation of Liquid Crystal Device 8)

UV-ozone-treated ITO glass substrates (manufactured by IGC) were dipped in 1% by weight solution of 2-cyanoethyltriethoxysilane (manufactured by Tokyo Chemical Industry Co., Ltd.) in toluene for 24 hours. The substrates were washed with a neutral detergent/2-propanol and then dried, thereby preparing surface-treated substrates 2. A cell in which a polystyrene spacer (Sekisui Chemical Co., Ltd.) was inserted with a cell gap of 15 μm into the space between the two surface-treated substrates was prepared.

The liquid crystal composition 4 was injected into the cell to prepare a liquid crystal device 8, and it was confirmed by observation under a polarization microscope that its cholesteric liquid crystal exhibits an excellent Grandjean orientation.

(Evaluation of the Device)

A DC voltage of 4 V, 3 A, was applied for 2 minutes to the prepared liquid crystal device 8, and its selective reflection wavelength change was confirmed with a multi-channel spectrometer USB-2000 (manufactured by Ocean Optics, Inc.).

Example 11

Use of Carbon Electrode (Preparation of Liquid Crystal Device 9)

A cell in which a polystyrene spacer (Sekisui Chemical Co., Ltd.) was inserted with a cell gap of 15 μm into the space between a surface-polished GC (glassy carbon) electrode substrate (manufactured by Tsukuba Material Information Laboratory Ltd.) and a horizontally oriented film SE-6414 (manufactured by Nissan Chemical Industries, Ltd.) was prepared. The liquid crystal composition 4 was injected into the cell to prepare a liquid crystal device 9.

(Evaluation of the Device)

A DC voltage of 4 V, 3 A, was applied for 1 minute to the prepared liquid crystal device 9 with the GC electrode as a positive electrode and the oriented film-treated substrate as a negative electrode, and its selective reflection wavelength change was confirmed with a multi-channel spectrometer USB-2000 (manufactured by Ocean Optics, Inc.), and thereafter when a reversed DC voltage of −4V, 3 A was applied for 1 minute thereto, the selective reflection wavelength was returned to the original wavelength.

From the above results, it can be seen that according to the invention, there can be provided an optical material and an optical device capable of multicolor display with low voltage and at high response by simple device constitution.

According to the invention, there can be provided a liquid crystal composition, a liquid crystal device, a reflective display material and a light modulating material which are capable of multicolor display with low voltage and at high response even by a single device.

What is claimed is:

1. A liquid crystal composition, comprising:
   at least one dopant;
   a supporting electrolyte; and
   a host liquid crystal,
   wherein the host liquid crystal exhibits selective reflection and changes its selective reflection wavelength by a redox reaction of the at least one dopant induced by an electric field.

2. The liquid crystal composition of claim 1, wherein the electric field is created by application of a DC voltage.

3. The liquid crystal composition of claim 1, wherein the redox potential of the dopant is −2.5 V to +2.5 V relative to a reference electrode SCE.

4. The liquid crystal composition of claim 1, wherein the at least one dopant comprises a chiral dopant.

5. The liquid crystal composition of claim 4, wherein the change of the selective reflection wavelength occurs by a change in pitch length of the chiral dopant.

6. The liquid crystal composition of claim 5, wherein the change in pitch length occurs by a change in the concentration of the chiral dopant.

7. The liquid crystal composition of claim 5, wherein the change in pitch length occurs by a change in the HTP value of the chiral dopant.

8. The liquid crystal composition of claim 4, wherein the total concentration of all chiral dopants including the chiral dopant is 3 to 30% by weight.

9. The liquid crystal composition of claim 7, wherein the HTP value of the chiral dopant is 1 to 100.

10. The liquid crystal composition of claim 4, wherein the chiral dopant is a compound represented by the following formula (I):

$$A((L)x\text{-}(D)w\text{-}(Rd)_s\text{-}(B)z)_y \qquad (1)$$

wherein A represents a site having an asymmetric carbon atom; L represents a divalent linking group; Rd represents a site causing a redox reaction; B represents a liquid crystalline substituent; D represents an arylene group; a heteroarylene group or a divalent alicyclic hydrocarbon group; x represents 0 or 1; z represents an integer of 0 to 3; y represents an integer of 1 to 4; w represents 0 or 1; s represents 0 or 1 provided that the total number of Rds is 1 to 4; when z is 2 or more, a plurality of Bs may be the same or different; and when y is 2 or more, a plurality of ((L)x-(D)w-(Rd)$_s$-(B)z) units may be the same or different.

11. The liquid crystal composition of claim 1, which comprises 0.1 to 20% by weight of the supporting electrolyte.

12. A liquid crystal device having:
   a pair of electrodes, at least one of which is a transparent electrode, and
   a liquid crystal layer containing the liquid crystal composition of claim 1 positioned between the electrodes.

13. The liquid crystal device of claim 12, which comprises a polyimide film on at least one of the electrodes.

14. The liquid crystal device of claim 12, wherein the driving voltage is 0.1 to 20 V.

15. The liquid crystal device of claim 12, wherein the resistance of the transparent electrode is 100Ω/☐ or less.

16. The liquid crystal device of claim 12, wherein a gap between the pair of electrodes is 2 to 50 μm.

17. A reflective display apparatus comprising the liquid crystal device of claim 12.

18. A light modulating apparatus comprising the liquid crystal device of claim 12.

* * * * *